US008572271B2

(12) United States Patent
Raveendran

(10) Patent No.: US 8,572,271 B2
(45) Date of Patent: Oct. 29, 2013

(54) MULTIMEDIA MANAGEMENT SYSTEM FOR SEAMLESS MULTIMEDIA CONTENT MOBILITY

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 12/688,984

(22) Filed: Jan. 18, 2010

(65) Prior Publication Data

US 2010/0191859 A1    Jul. 29, 2010

Related U.S. Application Data

(60) Provisional application No. 61/148,152, filed on Jan. 29, 2009.

(51) Int. Cl.
  *G06F 15/16* (2006.01)
  *G06F 15/173* (2006.01)

(52) U.S. Cl.
  USPC .......................................... 709/231; 709/224

(58) Field of Classification Search
  USPC .......................................................... 709/231
  See application file for complete search history.

(56) References Cited

U.S. PATENT DOCUMENTS

| | | | |
|---|---|---|---|
| 6,324,169 B1 * | 11/2001 | Roy .............................. | 370/260 |
| 6,731,947 B2 | 5/2004 | Hoagland et al. | |
| 7,231,454 B2 | 6/2007 | Togashi | |
| 7,765,599 B2 | 7/2010 | Casas et al. | |
| 7,907,213 B1 | 3/2011 | Biere et al. | |
| 7,962,126 B2 | 6/2011 | Haung et al. | |
| 8,098,582 B2 | 1/2012 | Aaron et al. | |
| 8,131,311 B2 | 3/2012 | Bandera et al. | |
| 2003/0099234 A1 | 5/2003 | Horii et al. | |
| 2003/0211848 A1 | 11/2003 | Rajkotia et al. | |
| 2004/0192322 A1 * | 9/2004 | Dacosta et al. ............ | 455/452.1 |

(Continued)

FOREIGN PATENT DOCUMENTS

| | | |
|---|---|---|
| CN | 101194491 A | 6/2008 |
| JP | 2003196076 A | 7/2003 |

(Continued)

OTHER PUBLICATIONS

International Search Report and Written Opinion—PCT/US2010/022604, International Search Authority—European Patent Office—May 7, 2010.
Product Brochure, Multimode, Multimedia, Multiband Seamless Mobility, 2 pages, 2004.

*Primary Examiner* — Hee Soo Kim
(74) *Attorney, Agent, or Firm* — Steven R. Thiel; Brent Boyd

(57) ABSTRACT

In general, techniques are described for providing a multimedia management system to facilitate multimedia content mobility. More specifically, an apparatus may implement the techniques. The apparatus may comprise one or more wireless modems and a control unit. The one or more wireless modems receive multimedia content in a first format from a first application over a wireless communication channel. The control unit includes a Multimedia Management System (MMS) that configures the control unit to provide a multimedia bridge between the first format and a second format, where the second format is supported by a second application. The configured multimedia bridge transforms the multimedia content from the first format to the second format concurrent to the one or more wireless modems receiving a portion of the multimedia content.

46 Claims, 10 Drawing Sheets

(56) References Cited

U.S. PATENT DOCUMENTS

| | | |
|---|---|---|
| 2005/0037740 A1 | 2/2005 | Smith et al. |
| 2005/0265395 A1 | 12/2005 | Kim et al. |
| 2007/0073904 A1 | 3/2007 | Leung et al. |
| 2008/0025535 A1* | 1/2008 | Rajapakse .................... 381/311 |
| 2008/0086550 A1 | 4/2008 | Evora et al. |
| 2008/0233992 A1* | 9/2008 | Oteri et al. .................... 455/522 |
| 2008/0240155 A1* | 10/2008 | Cosquer et al. ............... 370/466 |
| 2008/0247541 A1* | 10/2008 | Cholas et al. ................. 380/200 |
| 2008/0305834 A1 | 12/2008 | Janiszewski et al. |
| 2009/0298484 A1* | 12/2009 | White ....................... 455/414.3 |
| 2010/0189064 A1 | 7/2010 | Raveendran |

FOREIGN PATENT DOCUMENTS

| | | |
|---|---|---|
| JP | 2004297381 A | 10/2004 |
| JP | 2006025372 A | 1/2006 |
| JP | 2006086751 A | 3/2006 |
| WO | 99/03440 | 1/1999 |
| WO | WO2006053041 A1 | 5/2006 |
| WO | WO2006116190 A2 | 11/2006 |
| WO | WO2008011384 A2 | 1/2008 |
| WO | WO2008011607 | 1/2008 |

* cited by examiner

MULTIMEDIA MANAGEMENT SYSTEM FOR SEAMLESS MULTIMEDIA CONTENT MOBILITY

This application claims the benefit of U.S. Provisional Application No. 61/148,152, filed Jan. 29, 2009, the entire content of which is incorporated herein by reference.

This application is related to U.S. patent application filed on the same date as the present application, entitled "Link Management for Multimedia Content Mobility," (temporarily referenced by Ser. No. 12/688,992), which is assigned to the assignee of the present application and incorporated herein by reference in its entirety.

TECHNICAL FIELD

The disclosure relates to multimedia content and, more particularly, techniques for transferring multimedia content between devices.

BACKGROUND

A multimedia ecosystem may comprise a number of multimedia devices that communicate multimedia content between one another using a particular set of multimedia file formats. With the recent rise of wireless networks, many of the multimedia file formats have evolved to facilitate communication over these wireless networks. Multimedia devices that each implement the same set of multimedia file formats for communicating multimedia content between one another over a wireless network may form what may be referred to as a wireless multimedia ecosystem. These multimedia devices of wireless multimedia ecosystems may include particular types of wireless modems to communicate via the one or more wireless networks.

A number of different types of modems exist by which to transfer multimedia content wirelessly. Example wireless modems include Wireless Personal Area Network (WPAN) modems (e.g., Bluetooth™ modems), cellular modems (e.g., Universal Mobile Telecommunications System or UMTS modems, Global Systems for Mobile communications or GSM modems, High-Speed Downlink Packet Access or HSDPA modems, and High-Speed Uplink Packet Access or HSUPA modems), Wireless Wide Area Network (WWAN) modems (e.g., Worldwide Inter-operability for Microwave Access or WiMax modems), and Wireless Local Area Network (WLAN) modems (e.g., Wi-Fi™ modems or other modems compliant with the Institute of Electrical and Electronics Engineers or IEEE 802.11 set of standards). Each of these different modems may implement different forms and levels of Forward Error Correction (FEC), communicate via different wireless communication channels, and consume different levels of power.

In addition, a number of different multimedia file formats exist for segmenting and encapsulating the multimedia content. The multimedia file formats may comprise specific transport and/or application layer protocols used to encode the multimedia content or particular container or wrapper file formats. Often, these different file formats may be specific to a particular application, such as streaming multimedia content. For example, a desktop computer may store digital video multimedia content formatted in accordance with a container format, commonly referred to as "MP4," defined by a Moving Pictures Expert Group (MPEG) 4, part 14 for these streaming applications. Other file formats for streaming multimedia content over a public network, such as the Internet, include an application layer protocol referred to as a Real-time Transport Protocol (RTP).

Given the wide variety of both types of wireless modems and file formats, multimedia ecosystems are often formed for very specific multimedia applications or, in some instances, groups of related multimedia applications. As a result, multimedia devices of one multimedia ecosystem typically only communicate with multimedia devices located in the same multimedia ecosystem. Moreover, while a multimedia device may belong to one or more multimedia ecosystems, inter-ecosystem communication is typically limited or prohibited by multimedia content providers to prevent wide-spread digital dissemination of the multimedia content for free. Consequently, multimedia content may tend to become fixed within a particular multimedia ecosystem.

SUMMARY

This disclosure relates to techniques for implementing a real-time Multimedia Management System (MMS) that provides seamless multimedia content mobility. Rather than limit multimedia content mobility to selected multimedia ecosystems in which only one or more supported multimedia formats are supported, the MMS provides a multimedia router, gateway, or bridge that facilitates the transfer of multimedia content between two or more multimedia devices regardless of the underlying type of modems and multimedia formats implemented by these devices.

The MMS may provide this transfer in real-time by configuring hardware, e.g., processors and other computing logic, necessary to perform this intermediation between these multimedia devices and providing an efficient memory structure to complement transformation between the formats supported by these various devices. The MMS may provide this real-time intermediation between devices while at the same time requiring little if any intervention by a user of the MMS. In this sense, the MMS may enable a real-time transfer of multimedia content seamlessly from a first device to a second device, where the first and second devices may include different types of wireless modems and implement different file formats.

In one aspect, a method comprises receiving multimedia content in a first format from a first application over a wireless communication channel established using one or more wireless modems, configuring a multimedia bridge between the first format and a second format, wherein the second format is supported by a second application, and transforming, with the configured multimedia bridge, the multimedia content from the first format to the second format concurrent to receiving a portion of the multimedia content.

In another aspect, an apparatus comprises one or more wireless modems that receive multimedia content in a first format from a first application over a wireless communication channel and a control unit that includes a Multimedia Management System (MMS) that configures the control unit to provide a multimedia bridge between the first format and a second format, wherein the second format is supported by a second application. The configured multimedia bridge transforms the multimedia content from the first format to the second format concurrent to the one or more wireless modems receiving a portion of the multimedia content.

In another aspect, an apparatus comprises communication means for receiving multimedia content in a first format from a first application over a wireless communication channel, means for configuring a multimedia bridge between the first format and a second format, wherein the second format is supported by a second application, and means for transforming, with the configured multimedia bridge, the multimedia content from the first format to the second format concurrent to receiving a portion of the multimedia content.

In another aspect, a computer-readable storage medium comprising instructions that cause a processor to receive multimedia content in a first format from a first application over a wireless communication channel via one or more wireless modems, configure a multimedia bridge between the first format and a second format, wherein the second format is supported by a second application, and transform, with the configured multimedia bridge, the multimedia content from the first format to the second format concurrent to receiving a portion of the multimedia content.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
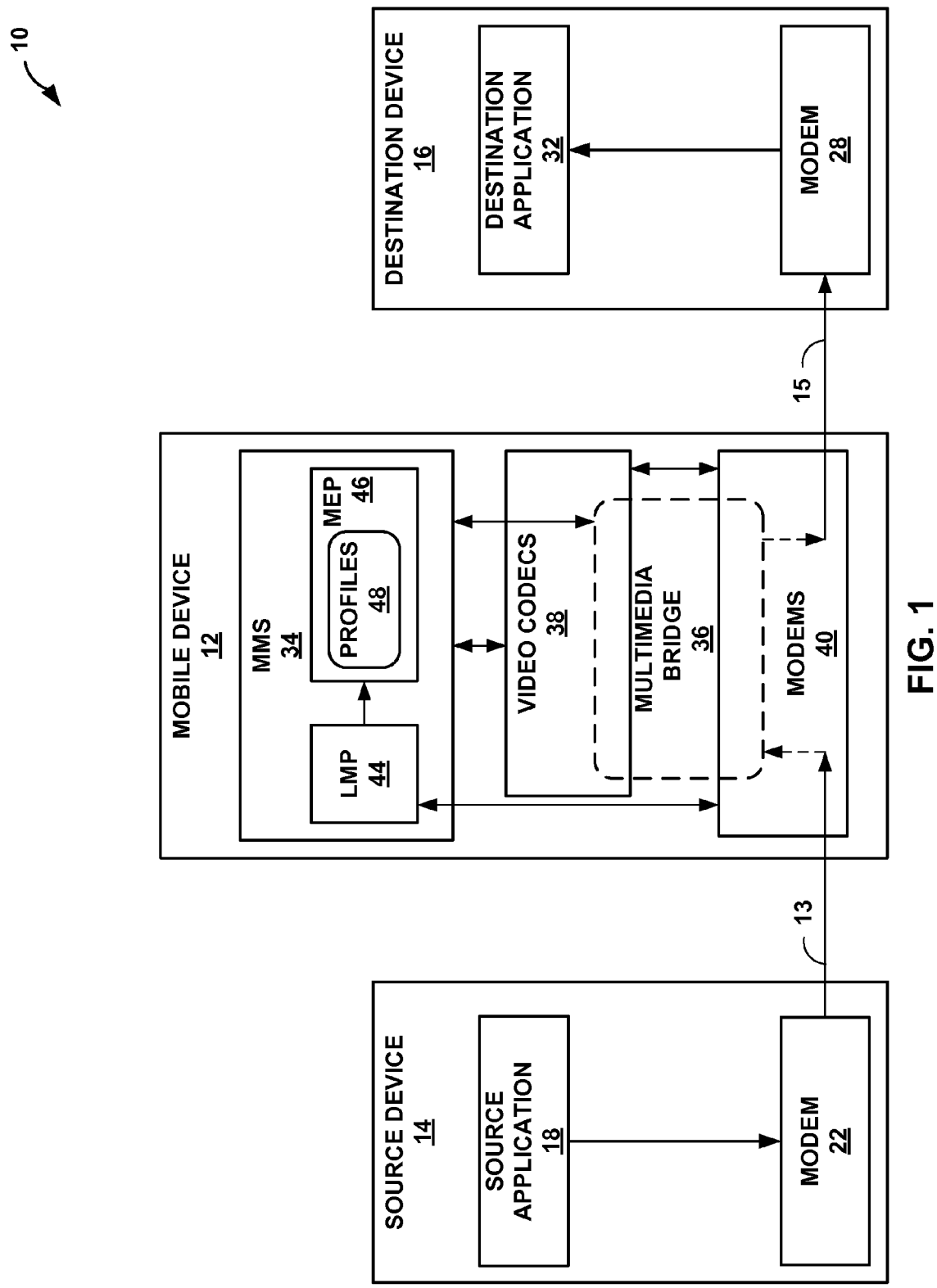
FIG. 1 is a block diagram illustrating an example system in which a mobile device implements the techniques described in this disclosure.

This disclosure is directed to techniques for implementing a real-time Multimedia Management System (MMS) that provides seamless multimedia content mobility. Rather than limit multimedia content mobility to multimedia ecosystems in which only one or more supported multimedia content file formats are supported, the MMS may provide a multimedia router, gateway, or bridge that facilitates the transfer of multimedia content between two or more multimedia devices regardless of the underlying type of wireless modems and multimedia file formats implemented by these devices. The MMS may provide this transfer in real-time by configuring hardware, e.g., processors, necessary to perform this intermediation between these multimedia devices and providing an efficient memory structure to complement transformation or trans-formatting between the file formats supported by these various devices. The MMS may provide this real-time intermediation between devices while at the same time requiring little if any intervention by a user of the MMS. In this sense, the MMS may enable a real-time transfer of multimedia content seamlessly from a first device to a second device, where the first and second devices may communicate the multimedia content via different types of wireless modems and implement different file formats by which to encode and decode the multimedia content.

In one aspect, the techniques are directed to an implementation of a Link Management Protocol (LMP) within the MMS that controls delivery of multimedia content via the wireless modems. In another aspect, the techniques are directed to an implementation of a Multimedia Exchange Protocol (MEP) within the MMS that controls the transformation of the multimedia content between file formats. While each of the above aspects of the techniques are generally described in this disclosure relative to one another, each of these aspects may be separately implemented or otherwise performed independently of one another or in separate and distinct contexts.

The techniques directed to an implementation of the LMP may involve monitoring channel data defining a set of characteristics associated with a wireless communication channel established between the MMS and another device. For example, the MMS may receive multimedia content from a first device via a first wireless communication channel. This first device may be referred to as a "source" device in that the first device is the source of the multimedia content. The MMS may then establish a second wireless communication channel with a second device. This second device may be referred to as a "destination" device in that the second device is the intended destination of the multimedia content. The MMS may implement the LMP to determine destination channel data defining a set of characteristics associated with the wireless communication channel established between the MMS and the destination device.

Based on the determined destination channel data, the LMP module may then be used to configure a wireless modem used to establish the second wireless communication channel to facilitate communication of the received multimedia content to the destination device. More particularly, an LMP unit may, based on the determined destination channel data, select an appropriate combination of parameters for configuring a logical channel, a physical layer channel, bandwidth allocation and Quality of Service (QoS). For example, the MMS may inform the LMP module of the destination multimedia application, e.g., streaming multimedia content, which the LMP unit may use to determine optional parameter values given the determined destination channel data. The LMP unit may then provide this configuration or combination of parameters to the wireless modem, e.g., a baseband processor of the wireless modem, and thereby optimally configure the wireless modem to suit a particular multimedia application. This configuration may involve selecting appropriate parameters with respect to a given multimedia application and channel characteristics to maximize so-called Quality of Experience (QoE) of a consumer that consumes the multimedia content.

This LMP aspect of the techniques may promote content mobility by facilitating the communication of multimedia content over wireless channels for a given multimedia application. This aspect of the techniques may enable, in effect, a device to act as a physical/data link layer bridge between two multimedia devices that reside in separate multimedia ecosystems and include different types of wireless modems. In this sense, the device that implements LMP in accordance with this disclosure may dynamically adapt different types of wireless modems to create a bridge between multimedia devices of different multimedia ecosystems. Moreover, as the dynamic adaption may occur with little if any required user input, this LMP aspect of the techniques may occur seamlessly from a perspective of a user of the device. Accordingly, LMP, when implemented in accordance with the techniques of this disclosure, may facilitate seamless mobility of multimedia content.

The aspect of the techniques directed to the MMS implementation of MEP may too facilitate seamless mobility of multimedia content. This aspect involves configuring a control unit to provide a multimedia bridge by which to transform content from a first format to a second format. For example, the MMS may receive multimedia content in a first format from a source device over a first wireless communication channel via one of the plurality of wireless modems. In response to receiving the multimedia content, the MEP may configure a control unit to provide the multimedia bridge between the first and second file formats.

In some instances, the MMS may automatically identify, via a discovery protocol or discovery aspect of a wireless protocol, a destination device for the received multimedia content. In other instances, the MMS may locate or otherwise identify a set of possible destination devices via the discovery protocol and present this set of devices via a user interface. A user may interact with the user interface to select or identify the destination device from the list. In any event, the MEP unit may store data defining a plurality of multimedia device profiles for each type of multimedia device. The profiles may define parameters for configuring the multimedia bridge within the control unit. The MEP may determine a profile associated with the source device (which may be referred to as a source profile) and a profile associated with the destination device (which may be referred to as a destination profile).

In some instances, the MEP unit may analyze header information stored within the first file format to which the multimedia content is wrapped to extract header parameters. The MEP unit may for example analyze transport and/or application layer headers of the file format wrapping the multimedia content to extract these header parameters, such as a codec to which the multimedia content was encoded, a resolution of the multimedia content, a frames-per-second (fps) of the multimedia content, and the like. Based on the destination profile and the extracted parameters, the MEP may then determine, as one set of examples, whether to re-encapsulate the multimedia content, trans-rate the multimedia content or transcode the multimedia content, each of which involves a transformation or reformatting of the multimedia content in various degrees from the first file format to the second file format.

In addition, the MEP unit may, in some instances, also base this determination on the configuration parameters determined by the LMP module in instances where the MMS implements both the LMP and MEP in accordance with the techniques described in this disclosure. In other instances, the MEP unit may communicate with a resource manager to determine resource parameters. The MEP unit may further base the determination of the transformation on these resource parameters as well. In each instance, the MEP unit may determine bridge configuration parameters to affect the determined transformation. The MEP unit may determine these bridge configuration parameters so as to minimize power consumption or, at least, reduce power consumption. This may be particularly beneficial when a mobile or other power-limited device implements the techniques described in this disclosure. The MEP unit may also determine these bridge parameters to facilitate real-time transfer of the multimedia content from the source device to the destination device.

The MEP unit may then configure the multimedia bridge within the control unit in accordance with the bridge configuration parameters. After configuring the multimedia bridge, the control unit transforms, with the configured multimedia bridge, the multimedia content from the first format to the second format, possibly while concurrently receiving the multimedia content. In this sense, the MEP aspect of the techniques may enable a device to dynamically adapt a control unit to provide a multimedia bridge between two different multimedia devices from two different multimedia ecosystems. This multimedia bridge may comprise a transport/application layer bridge that dynamically transforms multimedia content from one file format to another with little if any user input. Accordingly, the aspect of the techniques directed to the MMS implementation of MEP may, much like the LMP aspect of the techniques, facilitate seamless mobility of multimedia content.

Notably, the LMP and MEP aspects of the techniques are described below with respect to a single mobile device that includes an MMS having implementations of both the LMP and MEP. This MMS may therefore form a multimedia bridge that spans one or more of the physical and data link layers and one or more of the transport and application layers of the mobile device. Layers, as used in this disclosure, refer to layers of the Open Systems Interconnection (OSI) model. Physical, data link, transport and application layers may also be referred to as layers one, two, four and seven (or L1, L2, L4 and L7), respectively, where the number denotes an order of the layers within the seven layers of the OSI model. By combining both the LMP and MEP aspects of the techniques, the MMS may provide a bridge that spans multiple layers and which works to build the bridge from the lower layers (e.g., L1 and L2) to the upper layers (e.g., L4 and L7) by passing characteristics or parameters from the LMP to the MEP, such that the MEP may further optimize the bridge configuration parameters for configuring the upper layers of the multimedia bridge. Yet, as noted above, each of these aspects may be implemented separately from one another to form a multimedia bridge that spans, for example, only the lower or the upper layers of the OSI model. The techniques should therefore not be considered as limited to the particular, exemplary implementations described in this disclosure.

FIG. 1 is a block diagram illustrating an example system 10 in which a mobile device 12 implements the techniques described in this disclosure. While described with respect to a particular type of device, e.g., a mobile device 12, any type of device capable of communicating multimedia content between two or more devices using at least one type of wireless modem and/or transforming the multimedia content from one file format to another may implement the techniques described in this disclosure. In this respect, mobile device 12 generally represents one example of such a device capable of performing both wireless communication and the above transformation.

As shown in the example of FIG. 1, system 10 includes a source device 14 and a destination application 16, both of which communicate with mobile device 12 via a wireless communication channel 13 and 15, respectively. Each of devices 14, 16 may include a general purpose multimedia device, such as a personal computer, a workstation, a personal digital assistant (PDA), a mobile phone (including a so-called "smart phone"), or any other type of device comprising a general purpose processor capable of executing software and, particularly, multimedia software. Each of devices 14, 16 may alternatively comprise a dedicated multimedia device, such as a video camcorder, a digital video disc (DVD) player, a television, a set-top box (STB), a compact disc (CD) player, a digital media player (e.g., a so-called "MP3" player or a combination MP3/MP4 player), a digital video recorder (DVR), a global positioning system (GPS) device, or any other device dedicated to a set of one or more multimedia applications and that typically does not enable user control over the loading and execution of multimedia software.

Regardless of whether representative of a general purpose device or a dedicated multimedia device, source device 14 generates video data in a first format for transmission to destination device 16. Source device 14 includes a source application 18 and a modem 22. Source application 18 of source device 14 may, as one example, include a video capture device, such as a video camera, a video archive containing previously captured video, or a video feed from a video content provider. As a further alternative, source application 18 may, as another example, generate computer graphics-based data as the video, or a combination of live or archived video and computer generated video. In some cases, if source application 18 is a video camera, source device 14 may form a so-called camera phone or video phone, or any other type of camera-equipped computing or communication device, including mobile telephones or other devices. In other aspects, source application 18 may be coupled to or integrated with a source device 14. In some instances, the captured, pre-captured, and/or computer-generated video may be encoded by a video encoder (not shown in FIG. 1) for transmission from source device 14 to mobile device 12 via modem 22 over wireless communication channel 13.

This video encoder may receive video data from source application 18. The video data received from source application 18 may be arranged in a video sequence comprising a series of video data units, such as video frames. Some or all of the frames may be divided into smaller video data units, such as video slices. The video encoder may operate on blocks of pixels (referred to herein as video blocks) within individual video frames or slices in order to encode the video data. A frame or slice may contain multiple video blocks. The video blocks may have fixed or varying sizes, and may differ in size according to a specified coding standard. A 16×16 pixel video block, commonly referred to as a macroblock (MB), may be arranged into sub-blocks.

As an example, the International Telecommunication Union Standardization Sector (ITU-T) H.264/MPEG-4, Part 10, Advanced Video Coding (AVC) (hereinafter "H.264/MPEG-4 AVC" standard) supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In general, MBs and the various sub-blocks may be considered to be video blocks. Thus, MBs may be considered to be video blocks, and if partitioned or sub-partitioned, MBs can themselves be considered to define sets of video blocks. In some aspects, neighboring availability check techniques may direct availability determinations based on the width of video block, such as a MB or sub-block.

While the techniques are described in this disclosure with respect to a variety of video data units, such as video frames or video slices, the techniques may be generally applicable to any encoding and decoding of video and/or audio data. Moreover, the techniques are described in this disclosure with respect to video data encoded and decoded according to the H.264/MPEG-4 AVC standard. However, the techniques are described in reference to this standard for purposes of illustration. In various aspects, such techniques may, however, be readily applied to any of a variety of other video coding standards, such as those defined by the Moving Picture Experts Group (MPEG) in MPEG-1, MPEG-2 and MPEG-4, the ITU-T H.263 standard, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video and/or audio coding standard defined by a standards body or developed by an organization as a proprietary standard.

For purposes of illustration, and without limitation, application of various coding techniques will be described with reference to H.264/MPEG-4 AVC coding. The video encoder may encode each block (e.g., a macroblock (MB)) according to intra-coding and inter-coding prediction schemes, e.g., as set forth in the H.264/MPEG-4 AVC standard. Following intra- or inter-based prediction of the video blocks, the video encoder may perform a number of other operations on the video blocks. These additional operations may include transformation operations (such as 4×4 or 8×8 integer transform used in H.264/MPEG-4 Part 10 AVC or a discrete cosine transformation DCT), quantization operations, entropy coding operations and filtering operations. The video encoder may then encode each of the blocks of the sequence of video frames and output encoded video data, which may be referred to as an "encoded bitstream."

Modem 22 of source device 14 may manage the lower layer transmission of the multimedia content, e.g., transmission over the physical and data link layers. Layers, as described above, may refer to various layers of the Open Systems Interconnection (OSI) model. Modem 22 may, for example, configure and establish communication channel 13 with mobile device 12 for communication of the encoded video data. Modem 22 may then transmit the encoded video data to mobile device 12 over channel 13.

Likewise, regardless of whether representative of a general purpose device or a dedicated multimedia device, destination device 16 receives the encoded video data via wireless communication channel 15 from mobile device 12. Destination device 14 may include a wireless modem 28 and destination application 32. In some instances, destination device 14 may include a video decoder that may decode the encoded video data to obtain the original video data for playback on a display device. Destination application 32 may comprise any application that utilizes the video data regardless of whether the video data is decoded.

Modem 28 may, like modem 22 of source device 14, manage the lower layer transmission of the multimedia content, e.g., transmission over the physical and data link layers. Modem 28 may, for example, configure and establish communication channel 15 with mobile device 12 for communication of the formatted video data. Modem 28 may then receive the formatted video data via wireless communication channel 15. Modems 22 and 28 may each comprise one or more types of a wireless modem, including a Wireless Personal Area Network (WPAN) modem (e.g., a Bluetooth™ modem), a cellular modem (e.g., a Universal Mobile Telecommunications System or UMTS modem, a Global Systems for Mobile communications or GSM modem, a High-Speed Downlink Packet Access or HSDPA modem, and a High-Speed Uplink Packet Access or HSUPA modem), a Wireless Wide Area Network (WWAN) modem (e.g., a Worldwide Inter-operability for Microwave Access or WiMax modem), and a Wireless Local Area Network (WLAN) modem (e.g., a Wi-Fi™ modem or other modem compliant with the Institute of Electrical and Electronics Engineers or IEEE 802.11 set of standards). Each of these different modems may implement different forms and levels of Forward Error Correction (FEC), communicate via different wireless communication channels, and consume different levels of power.

For purposes of illustration, it is assumed that source device 14 and destination device 16 reside within separate multimedia ecosystems. In other words, it is assumed that source device 14 includes a modem 22 different from modem 28 of destination device 16 and therefore source device 14 may not directly communicate with destination device 16. In addition, it is assumed that source device 14 implements a different file format than that implemented by implemented by destination device 16. That is, source application 18 may generate video data in a format that destination application 32 does not support in that destination application 32 may only support, e.g., have the ability to decode or interpret, video data of a different format.

As used in this disclosure, formats, in one aspect, may refer to encodings of multimedia content that facilitate transmission of the multimedia content from a source device to a destination device. An example format may include an MP4 file format defined by a Moving Pictures Expert Group (MPEG) 4, part 14. The MP4 file format is a container file format that is typically used to store digital audio and digital video streams. Other container file formats comprise a simplified version of the MP4 file format referred to as 3GP, an Advanced Systems Format (ASF), an Advanced Video Interleave (AVI) file format, a DivX Media Format (DMF), an Enhanced Video Object (EVO) file format, and a Flash video file format. Formats may, in this aspect or other aspects, also refer to formats used with respect to particular transport and/or application layer protocols, such as a Real-time Transport Protocol (RTP) and a Stream Control Transmission Protocol (SCTP). Generally, format refers to any description or characteristic of multimedia content or data, such as resolution in the instance of video, codec used to encode the multimedia data, and the like.

Source application 18 may generally refer to hardware or both hardware and software that provides multimedia content. In some instances, source application 18 may operate within source device 14 while, in other instances, source application 18 and source device 14 may comprise the same device. Source application 18 is shown separate from source device 14 in the example of FIG. 1 to indicate those instances where source application 18 executes within source device 14, e.g., as a software process executing on a processor. The techniques described in this disclosure should not be limited to the example of FIG. 1.

Likewise, destination application 32 may generally refer to hardware or both hardware and software that is a target for or consumer of multimedia content. Destination application 32 may, in some instances, operate within destination device 16 while, in other instances, destination application 32 and destination device 16 may comprise the same device. Destination application 32 is shown separate from destination device 16 in the example of FIG. 1 to indicate those instances where destination application 32 executes within destination device 16, e.g., as a software process executing on a processor. The techniques described in this disclosure should not be limited to the example of FIG. 1.

Moreover, application as used herein should not be limited to either instance described above, but may include dedicated devices, such as a display device, and/or software processes executing on a processor.

In accordance with the techniques described in this disclosure, mobile device 12 includes a multimedia management system 34 ("MMS 34") that dynamically configures a multimedia bridge 36 to transform the video data from the first format implemented by source application 18 to the second file format implemented by destination application 32. Multimedia bridge 36 is shown as a dash-lined box in FIG. 1 to reflect that multimedia bridge 36 is a logical bridge and not statically hard-coded or otherwise configured on a permanent basis. Moreover, multimedia bridge 36 is shown in FIG. 1 to span both video encoders/decoders 38 ("video codecs 38") and modems 40 to reflect that multimedia bridge 36 is dynamically configured across both video codec 38 and modems 40 of mobile device 12. In this respect, multimedia bridge 36 may provide a bridge between different file formats and different types of wireless modems.

Transformation, as used in this disclosure, generally refers to any modification of the video data. An example transformation therefore may comprise re-encapsulating the video data either partially or wholly. Another example transformation may comprise trans-rating the video data within the same codec by dropping frames or re-quantization of the encoded video data. Yet another example transformation may comprise transcoding the video data by changing a coding format with or without scaling. Each of these various transformation are described in more detail below.

In addition to MMS 34, mobile device 12 includes video codecs 38 and modems 40. Video codec 38 may comprise a combination of both a video encoder and a video decoder. Often a video encoder includes an integrated video decoder for decoding content encoded by the video encoder. These video encoders with integrated video decoder are commonly referred to as a video codec or CODEC. Often, a graphics processing unit (GPU) or other type of processing unit, multimedia processor or dedicated hardware, such as an Application Specific Integrated Circuit (ASIC), implements the video codec. Alternatively, a general purpose processing unit, such as a central processing unit (CPU), may execute software to implement the video codec. In this sense, video codec 38 may represent hardware and/or a combination of hardware and software that implements a plurality of video codecs.

Modems 40 may comprise a plurality of wireless modems 40, each of which may include a different one of the types of wireless modems listed above with respect to modems 22 and 28. Typically, each of these different types of wireless modems may include a dedicated baseband processor or other processing element that manages the transmission of data over the lower level layers of the OSI model. However, in some instances, a single baseband processor may implement one or more types of wireless modems. Regardless, modems 40 generally represent at least one baseband processor that implements at least one type of wireless modem.

Initially, MMS 34 may discover or otherwise detect source device 12 via a discovery protocol or some other discovery mechanism within a wireless communication protocol. Typically, MMS 34 may interact with modems 40 to cause one or more of modems 40 to detect any device within wireless communication range of each of these modems 40. Specifically, MMS 34 includes a Link Management Protocol (LMP) module 44 ("LMP 44") that communicates with modems 40 to detect any devices within the wireless communication ranges of modems 40 of mobile device 12. LMP may refer to a protocol described in detail in this disclosure whereby LMP module 44 may communicate with modems 40 to determine parameters by which to configure the lower layers of multimedia bridge 36.

Although not shown in FIG. 1, MMS 34 may include a user interface module that presents a user interface. The user interface may list the detected devices. A user or other operator of mobile device 12 may interact with the presented user interface to select a source device, e.g., source device 14. The user interface module may, upon receiving this selection, also present another user interface listing the detected devices minus the selected device. This user interface may prompt the user to select a destination device. The user may then interact with this second user interface to select a destination device from this second list, e.g., destination device 16. In this respect, MMS 34 may identify at least one source device 14 and at least one destination device 16. Alternatively, MMS 34 may automatically select the source and destination devices form the list without prompting or otherwise requesting intervention from the user.

Based on the selected (either automatically or via user intervention) destination device 16, LMP module 44 may determine which of modems 40 should be used to communicate with destination device 16 and establishing, with this one of wireless modems 40, wireless communication channel 15 with destination device 16. This one of wireless modems 40 may be referred to as a destination modem. LMP module 44 may communicate with this destination modem to determine destination channel data defining a set of characteristics associated with wireless communication channel 15. These characteristics may comprise a Bit-Error-Ratio (BER), Packet Error Rate (PER), a Signal-to-Noise Ratio (SNR), a Forward Error Correction (FEC) strength, frequency or time diversity associated with a channel coding, and error distribution characteristics (e.g., deep versus flat fade). LMP module 44 may then configure this one of wireless modems based on the destination channel data so as to facilitate, if not optimize, transmission of multimedia content received from source device 14 via wireless communication channel 15.

In some instances, LMP module 44 may interface with another one of wireless modems 40 that manages wireless communication channel 13 by which mobile device 12 communicates with source device 14. This other one of wireless modems 40 may be referred to as a source modem. LMP module 44 may interface with this source modem to determine source channel data defining a similar set of characteristics as those defined by destination channel data. LMP module 44 may then configure this source modem to facilitate, if not optimize, recovery of the multimedia content from the wireless signal sent via wireless communication channel 13. In this manner, LMP module 44 may interface with modems 40 to construct a multimedia bridge 36 that spans wireless modems 40.

Notably, the source and destination modems may comprise the same one of wireless modems 40. In this case, only the source modem involves the receive side of this same one of wireless modems 40 while the destination modem involves the transmission side of this same one of wireless modems 40. Each of the receive and transmission sides may for purposes of the techniques described in this disclosure represent separate modems and each of these sides may be individually configured by LMP module 44 to facilitate, if not optimize, recovery of the multimedia content from wireless signals sent over respective wireless communication channels 13 and 15.

MMS 34 may further include a Multimedia Exchange Protocol (MEP) module 46 ("MEP 46") that constructs the upper layers of multimedia bridge 36. In other words, MEP module 46 determines bridge configuration parameters by which to configure video codecs 38 in a manner that facilitates transformation of multimedia content encoded in accordance with a first format to multimedia content encoded in accordance with a second format. In this respect, MEP module 46 configures multimedia bridge 36 within a control unit of mobile device 12, e.g., the collection of video codecs 38 and any other supported processing units, such that multimedia bridge 36 spans multiple video codecs 38.

To configure multimedia bridge 36 in this manner, MEP module 46 may determine a number of different types of data on which to base the configuration parameters for the upper layers of multimedia bridge 36. First, MEP module 46 may receive either the source or destination channel data or both the source and destination channel data from LMP module 44. This channel data may define a set of characteristics that MEP module 46 may use in identifying acceptable types of file formats. LMP module 44 may also forward the selected source device 12 and destination device 16 to MEP module 46. Based on the selected source device 12 and destination device 16, MEP module 46 may select one or more of profiles 48. Each of profiles 48 may represent a multimedia device and/or application profile defining data that delineates file formats supported by the respective multimedia device and/or application, as well as, characteristics of those supported file formats. MEP module 46 may, for example, determine one of profiles 48 that corresponds to source application 18 (e.g., a source profile) and another one of profiles 48 that corresponds to destination application 32 (e.g., a destination profile). MEP module 46 may, in some instances, communicate with a resource manager module (not shown in FIG. 1) that manages utilization of resources within mobile device 12 to determine resource data delineating the current utilization of resources within mobile device 12. MEP module 46 may, in other instances, extract header data from the file format headers that wrap or encode the received multimedia content.

Based on one or more of these sets of data, e.g., the channel data, the device and/or application data, the resource data, and/or the header data, MEP module 46 may determine bridge configuration parameters that define a configuration for the upper layers of multimedia bridge 36. MEP module 46 may, in one aspect, select these bridge configuration parameters to configure multimedia bridge 36 such that it provides a real-time or low-latency (but not necessarily instantaneous) transformation of the multimedia content from the first file format to the second file format. MEP module 46 may, in another aspect, select these bridge configuration parameters to configure multimedia bridge 36 such that the transformation performed by multimedia bridge 36 conserves power or otherwise reduces power consumption.

Various techniques may be employed to configure multimedia bridge 36 to conserve or otherwise optimize power consumption. For example, power consumption may be improved through "smart" transcoding. In smart transcoding, multimedia content encoded in accordance with a form of entropy coding available to the H.264/MPEG-4 AVC video codecs referred to as Context Adaptive Binary Arithmetic Coding (CABAC) may be transcoded to a Context Adaptive Variable Length Code (CAVLC). Smart transcoding may acknowledge that CABAC may introduce significant latencies and inter-dependencies (e.g., data dependencies) that introduce serial operations incapable of being executed or performed in parallel. This serialization occurs due to context savings and multi-level decoding within a macroblock/slice decoding loop of codecs.

In any event, the inter-dependencies also increase a number of conditionals (e.g., branches in coding decisions) that increase usage or utilization of a processor (which may be referred to as a core). This increased utilization may increase power consumption. By transcoding the multimedia content to CAVLC, this power utilization may be decreased by a reduction in data dependencies. In this respect, this form of transcoding may be "smart" in that the transcoding may adapt transcoding in order to avoid known issues. In addition, smart transcoding may involve transcoding B-slices to P-slices to promote efficient power utilization by providing a net effect of Main profile to Baseline profile transcoding (e.g., which may be useful when one mobile with MMS is serving other mobile devices in this first mobile's user group).

Also, smart transcoding may involve decoding parameters from the received multimedia content and re-using (rather than re-computing) these parameters in the re-encoding process. For example, motion information, such as motion vectors, may be decoded and then re-used to re-encode the multimedia content before delivering that content to the destination device. This may reduce power consumption through re-use or recycling of parameter information. Smart transcoding may further include determining a number of macroblock rows (which allows parallelization) that a given channel can support based on bandwidth data provided by an LMP module, such as LMP module 44. This data may reduce power consumption by enabling MEP 48 to configure video codecs 38 so as to enable a maximum amount of parallelization, which as described above, may reduce power consumption. In effect, smart transcoding refers to a process whereby MMS 34 selects bridge configuration parameters 64 so as to configure a multimedia bridge 36 that is optimized more for latency and power and for ensuring optimum alignment between source and destination application 18, 32 rather than for compression efficiency.

MEP module 46 may then interface with video codecs 38 to configure one or more of video codecs 38 in accordance with the determined bridge configuration parameters. MEP module 46 may interface with video codecs 38 via application programmer interfaces (APIs) provided by each of video codecs 38. MEP 48 may determine which of the APIs to invoke and therefore which of video codecs 38 to configure based on the file format to which the multimedia content received from source application 18 is formatted and the selected one of the file formats supported by destination application 32, as set forth in the corresponding one of profiles 48. In this respect, each of video codecs 38 may correspond to one or more file formats.

Notably, MEP 48 may only configure a single one of video codecs 38 and, much like in the instance above where only one of wireless modems 40 is configured, configure a receive side, e.g., decoder, and a transmit side, e.g., encoder, of this one of video codecs 38. In this instance, the transformation may comprise a partial or whole re-encapsulation of the multimedia content from a first format to the second format. Alternatively, the transformation may comprise a trans-rating of the multimedia content within the same codec, which may involve dropping frames of the multimedia content or re-quantization of the multimedia content, to generate the second file format from the first file format. In this respect, the file format refers to the format of the multimedia content. The first file format may therefore differ in the format of the multimedia content from the resulting second file format. When transforming involves two or more of video codecs 38, the transformation may comprise a trans-coding whereby both the type of encoding and the format of the multimedia content may change from the first file format to the second file format.

LMP module 44 of MMS 34 may dynamically configure multimedia bridge 36 to receive multimedia content via a first one of wireless modems 40 and efficiently transmit this multimedia content via a second one of wireless modems 40. MEP module 46 of MMS 34 may also dynamically configure multimedia bridge 36 to transform the multimedia content received over the first one of wireless modems 40 from a first file format to a second file format. The combined configuration may therefore configure multimedia bridge 36 across various layers of the OSI model to facilitate, if not optimize, delivery of multimedia content from a source application 18 of a first multimedia ecosystem to a destination application 32 of a second, different multimedia ecosystem, where each of these devices include different types of wireless modems and support non-overlapping and therefore different sets of multimedia file formats. Moreover, the configuration may result in a multimedia bridge 36 that promotes efficient power utilization and/or seamless, real-time delivery and transformation of the multimedia content.

As an illustration, after configuring multimedia bridge 36, mobile device 12 may receive, via one of modems 40, multimedia content from source device 14 over wireless communication channel 13. Multimedia bridge 36 may receive this content via a first one of wireless modems 40 and provide error correction and other lower layer functionality to recover the multimedia content encoded in accordance with a first file format supported by source application 18 from a wireless, typically, radio signal. This source modem of multimedia bridge 36 may be configured by LMP module 44 based on the above described source channel data to provide more robust error correction and other lower layer functionality to improve recovery and/or promote efficient energy consumption.

This source modem of multimedia bridge 36 may then forward the recovered multimedia content formatted in the first file format to one of video codecs 38 of multimedia bridge 36, which may be referred to as the source video codec. MEP module 46 may configure this source video codec to promote efficient power consumption and/or real-time decoding of the multimedia content. The source video codec of video codecs 38 may decode the first file format to generate unformatted multimedia content and forward this unformatted multimedia content to another one of video codecs 38 that conforms with a file format supported by destination application 32 of destination device 16, which may be referred to as a destination video codec of multimedia bridge 36. MEP module 46 may configure this destination video codec to promote efficient power consumption and/or real-time encoding of the multimedia content.

Moreover, MEP module 46 may configure both of the source and destination video codecs to optimize parallel decoding and encoding of the multimedia content from the first file format to the second file format to promote efficient power consumption and/or real-time transformation of the multimedia content. With respect to real-time transformation of the multimedia content, MMS 34 may, in some aspects, configure multimedia bridge 36 to transform the multimedia content concurrent to receiving the multimedia content from source application 18.

The destination video coded of video codecs 38 may then forward the multimedia content encoded in accordance with the second file format to the destination modems multimedia bridge 36. Like the source modem, LMP module 44 may configure the destination modem of multimedia bridge 36 to improve recovery of the multimedia content by destination device 16 and/or promote efficient energy consumption by mobile device 12. This destination modem may then transmit the formatted multimedia content to destination device 16 over wireless communication channel 15.

In this manner, the techniques may facilitate dynamic configuration of a multimedia bridge 36 within a device, such as mobile device 12, to provide a bridge that enables communication between two devices, such as source device 14 and destination device 16. Multimedia bridge 36 may span lower layers, e.g., layers 1 and 2 or L1 and L2, of the OSI model by way of LMP module 44 configuring one or more of wireless modems 40 to establish wireless communication channels 13 and 15. Multimedia bridge 36 may span higher layers, e.g., layers 4 and 7, of the OSI model by way of MEP module 46 configuring one or more of video codecs 38 to facilitate the transformation of multimedia content from one file format to another file format. Considering that multimedia bridge 36 enables the communication of multimedia from one application to another, where a first one of the applications, e.g., source application 18, resides within one multimedia ecosystem and the other application, e.g., device application 32, resides within another multimedia ecosystem, multimedia bridge 36 may be referred to as a multimedia gateway inasmuch that multimedia bridge 36 acts as a gateway for multimedia to flow between two different multimedia ecosystems.

While described as facilitating a single direction of communication from source application 18 to destination application 32, the techniques may enable mobile device 12 to provide a multimedia bridge 36 that facilitates communication both from source application 18 to destination application 32 and destination application 32 to source application 18. In this respect, the techniques may enable mobile device 12 to provide a "duplex generic platform" in that multimedia bridge 36 provides a generic platform by which to facilitate communication between two or more applications simultaneously, which is referred to as duplex communication.

Figure 2A:
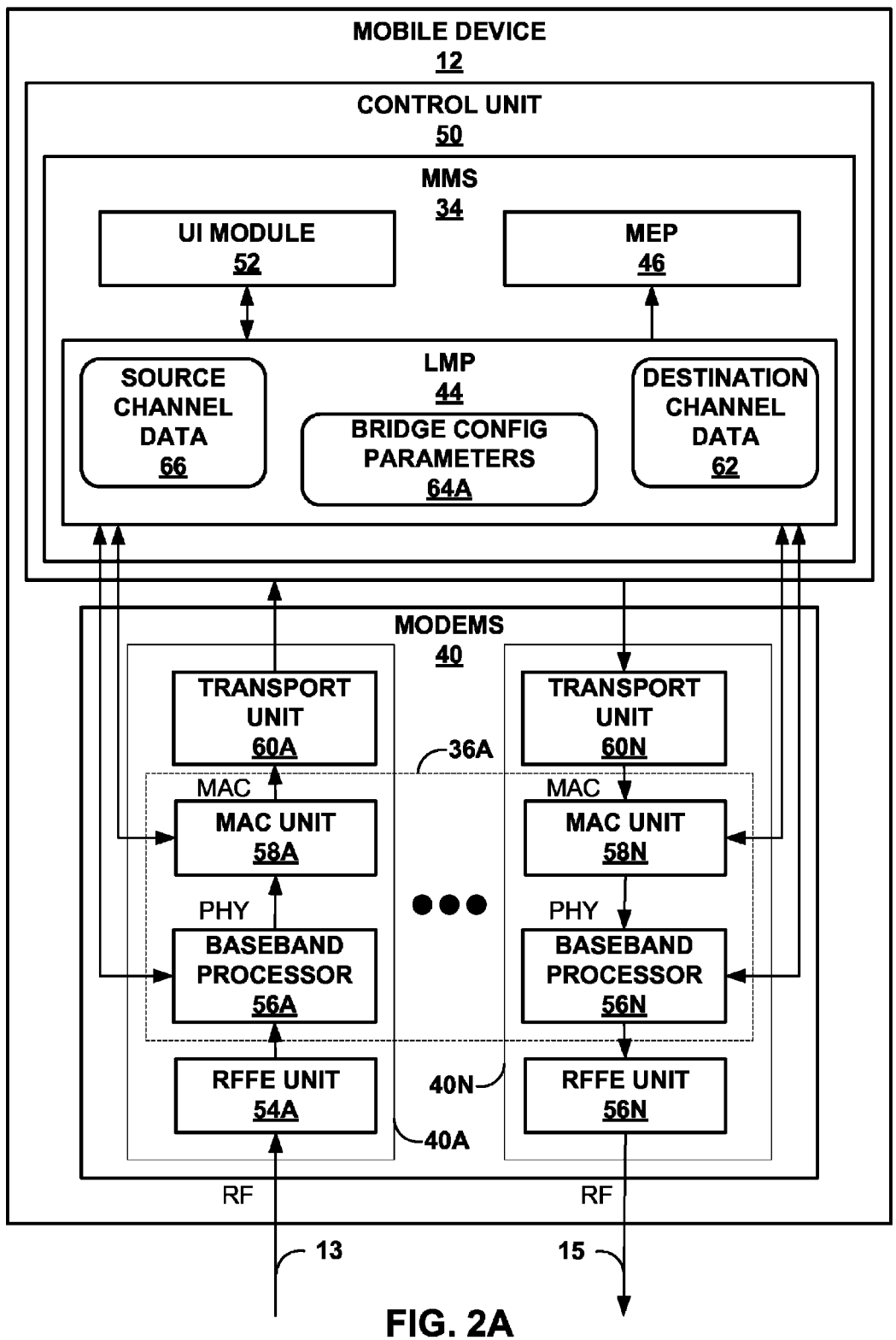
FIGS. 2A and 2B are block diagrams illustrating, in more detail, an example mobile device useful in implementing the techniques described in this disclosure.
Figure 2B:
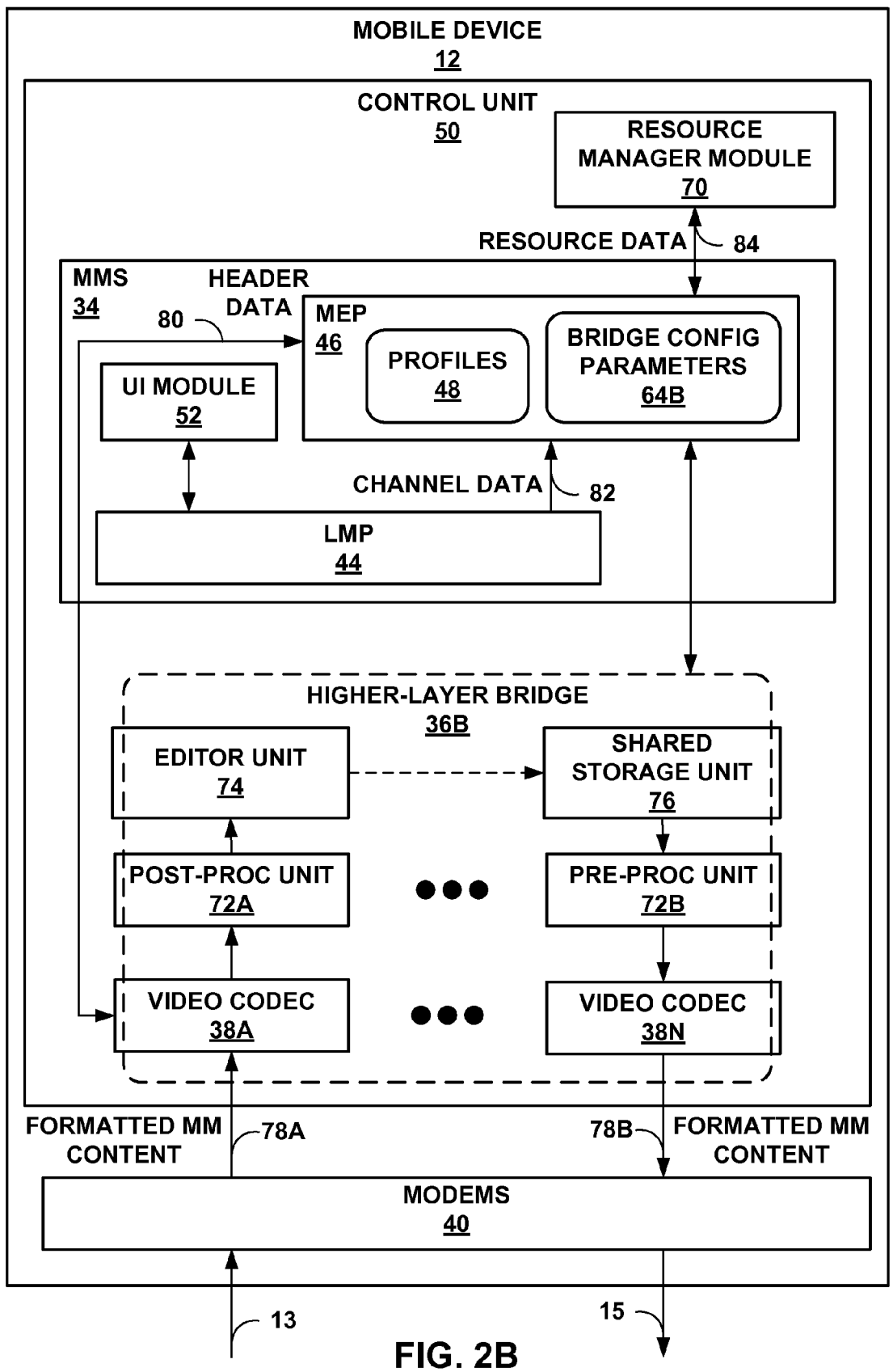

FIGS. 2A and 2B are block diagrams illustrating, in more detail, mobile device 12 in implementing the techniques described in this disclosure. In particular, FIG. 2A is a block diagram illustrating mobile device 12 in implementing the Link Management Protocol (LMP) aspect of the techniques described in this disclosure. FIG. 2B is a block diagram illustrating mobile device 12 in implementing the Multimedia Exchange Protocol aspect of the techniques described in this disclosure.

As shown in the example of FIG. 2A, mobile device 12 includes a control unit 50 that implements the techniques described in this disclosure. Control unit 50 may comprise one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described in this disclosure. Alternatively, control unit 50 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Particularly, control unit 50 implements MMS 34 that includes LMP module 44 and MEP module 46, as described above. MMS 34 may further include a user interface (UI) module 52 that presents a user interface, such as a Graphical User Interface (GUI) or a Command Line Interface (CLI), with which a user may interact to select one or more detected devices with which to form a bridge, as described above. Although not shown in FIG. 2A, mobile device 12 may comprise a display within which user interface module 52 interacts to present the above described user interface.

Modems 40 includes a plurality of different types of wireless modems 40A-40N ("wireless modems 40" or "modems 40"). Each of modems 40 includes one of Radio Frequency Front End (RFFE) units 54A-54N ("RFFE units 54"), one of baseband processors 56A-56N ("baseband processors 56"), one of Media Access Control (MAC) units 58A-58N ("MAC units 58") and one of transport units 60A-60N ("transport units 60"), respectively. Each of RFFE units 54 may comprise a transceiver to facilitate both transmission and receipt of wireless Radio Frequency (RF) signals. Typically, each of RFFE units 54 comprises various components to interface with an antenna (not shown in FIG. 2A) so as to receive and transmit RF signals, such as matching circuits, a band-pass filter, a Low-Noise Amplifier (LNA), and a mixer. RFFE units 54 may demodulate the received RF signals to extract an original information-bearing signal from a modulated carrier wave.

Baseband processors 56 may each comprise a dedicated processor or other execution unit for performing and controlling radio communications. Baseband processors 56 may generally decode a received information-bearing signal based on channel codes embedded in the information-bearing signal. Particularly, baseband processors 56 may decode the received information-bearing signal based on channel codes referred to as outer codes that are embedded in this signal. Baseband processors 56 may also embed or encode these outer codes in an information-bearing signal prior to sending this signal to a respective one of RFFE units 54. MAC units 58 may comprise a module or other unit that encodes and decodes the inner codes of the channel coding. Transport units 60 may comprise a module or other unit that implements one or more transport protocols, such as a Universal Datagram Protocol (UDP) and a Transmission Control Protocol (TCP), and/or an application layer protocol, such as the above described RTP.

Channel codes typically comprise an outer code, as described above, and an inner code and modems 40 may implement channel codes to ensure accurate delivery of the information-bearing signal. These codes may be used to perform error correction, such as Forward Error Correction (FEC). Thus, when baseband processor 56 and MAC units 58 decode and encode the information-bearing signals, these processors 56 may perform error correction generally and, in various aspects, FEC in particular.

The frequency with which these codes are embedded in the information-bearing signal may be determined based on a Signal-to-Noise ratio (SNR) and/or Bit Error Ratio (BER) determined for a given wireless communication channel. SNR refers to a ratio of a noise power corrupting a signal to a signal power. BER refers to a ratio of the number of bits or other information unit incorrectly received to a total number of bits or other information unit received during a specified time interval. Higher SNR or BER may typically require more frequent encoding of these codes within the information-bearing signal, which may decrease channel bandwidth (as less of the information-bearing signal is sent over a set time interval due to the increase of embedded codes). Lower SNR or BER may typically require less frequent encoding of these codes within the information-bearing signal, which may increase channel bandwidth (as more of the information bearing signal is sent over a set time interval due to the decrease of embedded codes). Consequently, error correction typically occurs at the expense of channel bandwidth.

In accordance with the techniques described in this disclosure, LMP module 44 configures the lower layers of multimedia bridge 36, which is shown in FIG. 2A as lower-layer bridge 36A, to facilitate, if not optimize, communication of multimedia content from source device 14 to destination device 16. That is, LMP module 44 may configure modems 40 used to establish the bridge so as to perform an appropriate level of error correction given an application to which the received multimedia corresponds.

For example, the multimedia content may be encoded with channel codes to ensure accurate, real-time delivery of the multimedia content across wireless communication channel 13. LMP module 44 may, after interfacing with one of modems 40 (e.g., modem 40N) to establish wireless communication channel 15, interface with this modem 40N to determine destination channel data 62 defining a set of characteristics associated with wireless communication channel 15. LMP module 44 may determine the BER and FEC strength, both of which are example characteristics associated with destination channel 15. Based on these characteristics, LMP module 44 may generally configure modem 40N and, more particularly, configure baseband processor 56N and MAC unit 58N of modem 40N to ensure accurate, real-time delivery over channel 15.

To configure baseband processor 56N and MAC unit 58N, LMP module 44 may determine bridge configuration parameters 64A ("bridge config parameters 64A") based on destination channel data 62. These bridge configuration parameters 64A may define a frequency with which MAC unit 58N and baseband processor 56N encode channel codes within multimedia content or data received from transport unit 60N. Bridge configuration parameters 64A may also define a type of FEC to perform or otherwise identify options or parameters that ensure a given level of channel bandwidth with a tolerable error rate. The error rate may be "tolerable" in that some applications or uses of the multimedia content may tolerate more errors than others. In other words, some applications may tolerate errors and lag caused by errors while others may demand strict error control to reduce lag. In any event, LMP module 44 may dynamically select bridge configuration parameters 64A based on real-time destination channel data 62 to suit a particular application for which the multimedia content was encoded. In the above instance, to ensure accurate, real-time or streaming application of the multimedia content, LMP module 44 may select parameters 64A that provide the best bandwidth to error rate ratio.

LMP module 44 may also interface with one of modems 40 that established wireless communication channel 13, e.g., modem 40A, to determine source channel data 66 that defines another set of characteristics associated with wireless communication channel 13. Source channel data 66 may include similar, if not substantially the same, characteristics as those described with respect to destination channel data 62. LMP module 44 may, in a manner similar to that described above with respect to destination channel data 62, determine bridge configuration parameters 64A based on source channel data 66. LMP module 44 may configure baseband processor 56A and MAC unit 58A of modem 40A using these bridge configuration parameters 64A determined from source channel data 66. LMP module 44 may configure modem 40A in this manner so as to facilitate, if not optimize, recovery of the multimedia content from a corresponding wireless RF signal sent via wireless communication channel 13. For example, LMP may configure modem 40A so as to, in one example, optimize FEC performed by both of baseband processor 56A and MAC unit 58A.

Accordingly, LMP module 44 may dynamically configure lower-layer bridge 36A to span multiple ones of modems 40, e.g., modems 40A and 40N, so as to facilitate, if not optimize in the above described manner, receipt and transmission of multimedia content via wireless communication channels 13 and 15. This optimization may involve selecting bridge configuration parameters 64A such that baseband processors 56A, 56N and MAC units 58A, 58N tailor FEC to suit a particular application for which the multimedia content is being delivered, such as a streaming application. While described with respect to multiple modems 40A and 40N, the LMP aspect of the techniques may be implemented with respect to a single modem to facilitate, if not optimize, receipt and transmission by a single modem of the multimedia content.

Referring to the example of FIG. 2B, control unit 50 of mobile device 12 further includes a resource manager module 70, post-processing unit 72A ("post-proc unit 72A"), pre-processing unit 72B ("pre-proc unit 72B"), editor unit 74 and a shared storage unit 76. Resource manager module 70 may represent a hardware and/or software module that monitors utilization and other characteristics of various resources, e.g., processors, memory, storage devices, registers, and the like, within mobile device 12. Post-processing unit 72A and pre-processing unit 72B, which may be referred to collectively as "processing units 72," may represent one or more processing units that may reformat the underlying data defining the multimedia content for alternate applications and/or devices. A single processing unit may implement both of post-processing unit 72A and pre-processing unit 72B. Editor unit 74 may represent a hardware and/or software module that adds and/or removes content from the multimedia content to prepare the multimedia content for different applications and/or devices. Shared storage unit 76 may represent a memory module or storage device that facilitates simultaneous or parallel writes and reads of data to and from a memory or storage device, thereby enabling "sharing" of data stored within shared storage unit 76.

Video codecs 38 are shown in the example of FIG. 2B as a plurality of video codecs 38A-38N for purposes of illustration. Video codecs 38 may each implement a different type or form of video codec. As mentioned above, the techniques may be implemented with respect to other kinds of codecs, including image codecs, audio codecs, combined video and audio codecs, and any combination thereof. Consequently, the techniques should not be limited to the example of FIG. 2B.

As described above with respect to the example of FIG. 2A, transport units 60 may implement a transport and/or application layer protocol. Transport units 60 may implement one or more of these protocols to reconstruct received multimedia content from a plurality of distinct data units or packets received from underlying MAC units 58. Transport units 60 may also implement one or more of these protocols to segment multimedia content received from video codecs 38 into one or more distinct data units or packets. Often, transport units 60 segment the content into distinct data units to facilitate transmission of the multimedia content over certain communication media. Transport units 60 may also segment the content into distinct data units to facilitate certain multimedia applications, such as real-time streaming of multimedia content.

In any event, transport units 60 may segment the multimedia content into distinct portions and append a header to the distinct portions so as to facilitate reconstruction of the multimedia content from the distinct portions. When wrapped within a header, the distinct portions of multimedia content may be referred to as a payload or payload data. To reconstruct the multimedia content, transport units 60 parse the header of each distinct data unit, extract the payload data and reconstruct the multimedia content based on the header information stored to the parsed headers. Transport units 60 may transmit the reconstructed multimedia content to control unit 50. This multimedia content is shown in FIG. 2B as formatted multimedia content 78A ("formatted MM content 78A"). Multimedia content 78A is "formatted" in that multimedia content 78A is formatted in accordance with a first file format.

In accordance with the techniques described in this disclosure, MEP module 46 may configure generally control unit 50 to provide higher-layer multimedia bridge 36B between the first format implemented by source application 16 and a second format implemented by destination application 32. To configure higher-layer multimedia bridge 36B, MEP module 46 may first collect various sets of data in order to determine bridge configuration parameters 64B ("bridge config parameters 64B").

In one aspect, MEP module 46 may analyze formatted multimedia content 78A to identify a format to which this multimedia content 78A is formatted and direct formatted multimedia content 78A to one of video codecs 38 that support this format, e.g., video codec 38A. Video codec 38A may analyze encoded multimedia codec 38A to identify headers associated with portions of the multimedia content. For example, multimedia content may be encoded in accordance with the H.264/MPEG-4 AVC standard, which may insert headers within the multimedia content to identify frames, slices, macroblocks and/or blocks. One or more of these types of encoding headers may store parameters related to a codec type or version, a resolution, a Frame Per Second (FPS), a bit rate, a number of coding layers, a coded frame type distribution (e.g., I-frame to P-frame ratios, I-frame to B-frame ratios, and/or P-frame to B-frame ratios), a Group of Pictures (GOP) length and/or structure, display parameters or multimedia application. MEP module 46 may interface with video codec 38A to determine these parameters, whereupon video codec 38A sends these parameters extracted from one or more headers of encoded multimedia codec 38A to MEP module 46 as header data 80.

In another aspect, LMP module 44 may forward source and destination channel data 62, 66 as channel data 82 to MEP module 46. In another aspect, LMP module 44 may, in addition to forwarding channel data 82, forward selections of source device 14 and destination device 16. Again, as described above, UI module 52 may present a user interface listing those devices within a range of modems 40 and a user may interact with this user interface to select source device 14 and destination device 16. UI module 52 may receive these selections and forward the selections to LMP module 44, which may establish lower layer bridge 36A in the manner described above. LMP module 44 may then forward channel data 82 to MEP module 46, as well as, as the selections of source device 14 and destination device 16. MEP module 46 may then, based on these selections, identify one or more of profiles 48 that correspond to selected devices 14, 16 and based on these source and destination profiles identify device data.

In yet another aspect, MEP module 46 may interface with resource manager module 70 to determine resource data 84. Resource data 84 may identify utilization and other characteristics relating to resources of mobile device 12, such as remaining battery power, remaining operating time, control unit utilization, memory utilization, storage device utilization, current total power consumption, or any other metric or characteristic related to the resources of mobile device 12.

In any event, MEP module 46 may receive various sets of data 80, 82 and 84, as well as, retrieve device data from one or more of profiles 48. After collecting or otherwise determining these sets of data, MEP module 46 may determine bridge configuration parameters 64B based on one or more of these sets of data. For example, MEP module 46 may select bridge configuration parameters 64B based on resource data 84 to optimize resource consumption within control unit 50 when resource data 84 indicates a high current utilization of resources.

To illustrate, MEP module 46 may coordinate or otherwise communicate with resource manager module 70 to determine resource data 84 that indicates an optimal clock frequency by which to transform multimedia content. This clock frequency may indicate a clock frequency at which that source video codec 38A and destination video codec 38N operate to achieve a target latency for real-time operation and/or to minimize power (e.g., run the source and destination codecs fast and then shut-down thereby managing an on/off duty cycle).

As another example, MEP module 46 may coordinate or otherwise communicate with resource manager module 70 to determine a core voltage at which each hardware core in the multimedia processing system can be driven to achieve power reductions. This form of adaptive voltage update is referred to as "dynamic voltage scaling." MEP module 46 may instruct resource manager module 70 to change the voltage at which each of these elements, e.g., the one or more cores that implement the source and destination video codecs, is powered. Both the clock frequency and core voltage may be dynamically adapted based on input from MMS 34 and more particularly MEP module 46 to resource manager module 70. While described above as directly configuring multimedia bridge 36, MMS 34 may also indirectly configure multimedia bridge 36 by specifying bridge configuration parameters 64 that are forwarded to resource manager module 70, which then updates multimedia bridge 36.

MEP module 46 may balance this selection of bridge configuration parameters 64B with header data 80 that may, for example, indicate that the application to which the multimedia content corresponds is a real-time streaming application. MEP module 46 may then specify bridge configuration parameters 46B to provide a baseline level of real-time streaming support but sacrifice quality to reduce decoding and encoding overhead, thereby simultaneously limiting or reducing the amount of resource that higher-layer bridge 36B may consume.

MEP module 46 may also access profiles 48 for destination device 16 to determine formats supported by destination device 16. MEP module 46 may then select one of these file formats to meet the objectives determined above, e.g., one that provides real-time transport, and specify bridge configuration parameters 64B to configure the transformation of formatted MM content 78A from the first format to this second format, which is selected by MEP module 46 to meet the above real-time and resource efficient objectives.

MEP module 46 may further utilize channel data 82 when specifying bridge configuration parameters 64B such that higher-layer bridge 36B re-encodes the MM content with sufficient resilience to accommodate certain channel characteristics, such as a noisy channel. MEP module 46 may, as one example, determine bridge configuration parameters 64B to overcome a noisy channel indicated by channel data 82 by specifying certain encoding parameters to limit the size of dependently coded sections of the multimedia content. The smaller size may facilitate transmission over a noisy channel in that losing a portion of a dependently coded section may prohibit decoding of that portion. However, as the section is purposefully set to a small size, the loss of this portion may represent a negligible impact to the viewing of the decoded multimedia content.

While only a small number of examples are discussed above for purposes of illustration, the techniques may be implemented such that MEP module 46 specifies bridge configuration parameters 64B to meet a wide variety of objects. MEP module 46 may specify bridge configuration parameters 64B to optimize power utilization or consumption, suit particular device or processor capabilities, accommodate real-time transfer or any other multimedia application, and provide seamless, e.g., insomuch that little if any user interaction is required, transition of multimedia data or content from a source application to a destination application.

To further illustrate, MEP 48 may also select bridge configuration parameters 64B so as to further optimize power consumption with respect to memories. These memory optimizations may rely on differences between on-chip memory and off-chip memory, which is represented by shared storage device 76. On-chip memory, such as caches, may consume significant amounts of power, as these are usually dynamic memories that need to be updated or refreshed frequently and each refresh consumes power. Off-chip memory may not consume nearly as much power due to either its lack of refresh or low refresh rates.

MEP 48 may select bridge configuration parameters 64B so as to optimize motion estimation for available caches such that a deterministic amount of data traverses from external memory where reference pictures are stored to on-chip caches for every macroblock or group of macroblocks. MEP 48 may then select bridge configuration parameters 48B to reduce the use of the cache and thereby reduce power consumption. MEP 48 may also select bridge configuration parameters 64B so that frame data in picture buffers is stored in memory banks where a fewer number of pages are opened every time data is retrieved for processing (such as for motion estimation).

As another illustration, MEP 48 may also select bridge configuration parameters 64B to provide memory optimizations by limiting memory bus bandwidth utilization, which is a major source of power consumption. Typically, data traverses between processing elements (e.g., CPU, hardware encoder, decoder, display processor, DSP, etc.) over the memory bus. MEP 48 may select bridge configuration parameters 64B such that a size (e.g., burst size) and frequency (e.g., number of bursts) of packets communicated between processing elements is optimized. For example, MEP 48 may determine optimal values for these bus parameters to reduce power consumption. MEP 48 may then select bridge configuration parameters 64B to configure motion estimation within the source and destination codecs such that an amount of data corresponding to each search region is aligned with the optimal bus parameters associated with the memory bus over which this data traverses. MEP 48 may determine the bus characteristics for each bus of mobile device 12 from resource manager module 70.

As yet another illustration, MEP 48 may provide overall memory optimization by selecting bridge configuration parameters 64B such that the video units or macroblocks decoded by the source codec are directed to cache in the destination codec in a lockstep manner. In other words, MEP 48 may select bridge configuration parameters 64B such that the source codec decodes the multimedia content in a time constrained manner that synchronizes decoding with the subsequent encoding performed by the destination codec. In this respect, multimedia bridge 36 may be configured to implement a transcoding pipeline of by time-coupling the source codec to the destination codec.

MEP 48 may also configure this pipeline for any transformation process and is not limited to transcoding pipelines. In this respect, MEP 48 may select bridge configuration parameters 46B to configure a processor pipeline that includes any number of hardware cores, firmware (e.g., DSPs), and/or computer processing units (CPUs). MEP 48 may select bridge configuration parameters 46B to define various interfaces and/or input/output operations between the various elements, where the interfaces and/or input/output operations may be data driven, register driven or interrupt driven. MEP 48 may determine which interface to select based on the application and other requirements of a given transformation.

In any event, after specifying bridge configuration parameters 64B, MEP module 46 may configure higher-layer bridge 36B by interfacing with video codec 38A, video codec 38N, post-processor unit 72 and editor unit 74 using one or more Application Programming Interfaces (APIs). That is, each of these various codecs and units may provide a respective API by which MEP module 46 may interface with these codecs and units. MEP module 46 may then load bridge configuration parameters 64B into these codecs and units to configure higher-layer bridge 36B.

Once configured in this manner, higher-layer bridge 36B may transform formatted multimedia content 78A from the first format to the second format concurrent to receiving formatted multimedia content 78A. In the example of FIG. 2B, higher-layer bridge 36B is shown configured to perform a highly involved transformation that requires transcoding formatted multimedia content 78A that corresponds to a first format into formatted multimedia content 78B that corresponds to a second format, where the first and second formats are encoded using different video codecs. The transcoding is then followed by a reformatting of the content, and an editing of the multimedia content itself. This type of transformation may facilitate viewing multimedia content on a particular device having known limitations, which may be defined in a corresponding one of device profiles 48.

To perform this transcoding operation, video codec 38A of higher-layer bridge 36B may receive formatted multimedia content 78A from one of modems 40 and decode the formatted multimedia content 78A. MEP 46 may configure higher-layer bridge 36B to select one of video codecs 38A based on header data 80 that indicates the codec used to encode formatted multimedia content 78A. In any event, video codec 38A may pass this decoded video content to post-processing unit 72A, which may reformat the decoded multimedia content for alternate application and devices.

As one example, the multimedia content may originally be encoded for real-time transmission over the Internet, where the content may typically be viewed in a relatively small window on a personal computer. Destination device 16 may, however, comprise a wireless television display rather than a computer, and MEP module 46 may specify bridge configuration parameters 64B such that post-processing unit 72A resizes and otherwise performs graphic operations on the decoded multimedia content to improve playback clarity on larger screens. In this respect, post-processing unit 72A may reformat or otherwise modify decoded multimedia content, e.g., by resizing the multimedia frames to larger size formats for larger display screens. Post-processing unit 72A may then forward the modified multimedia content to editor unit 74.

Editor unit 74 may further modify or edit the modified multimedia content by merging content from other applications. Typically, editor unit 74 is utilized when two or more source applications are simultaneously providing multimedia content for transformation and subsequent forwarding to one or more destination devices. Editor unit 74 may merge this separate content into a single multimedia content, such that the one or more destination devices may simultaneously present the separate content. Editor unit 74 may then store this edited multimedia content to shared storage unit 76. Shared storage unit 76 may be "shared" by all of the components, e.g., editor unit 74, post-processor unit 72 and video codecs 38, within a given higher-layer bridge, such as higher-layer bridge 36B. Certain benefits may be achieved by employing a shared storage unit 76, including more efficient power consumption and faster write and read times, which may improve, if not enable, mobile device 12 to provide real-time transformation of multimedia content form a first format to a second format.

Pre-processor unit 72B may then retrieve this edited multimedia content from shared storage unit 76 and perform pre-processing on this edited content to again facilitate the display or otherwise adapt the edited multimedia content to suit a particular application and/or destination device. Pre-processor unit 72B forwards this content to video codec 38N, which re-encoded the multimedia content to generate formatted multimedia content 78B. Video codec 38N forwards formatted multimedia content 78B to the same or another one of modems 40, which proceeds to transmit formatted multimedia content 78B via destination wireless communication channel 15 to destination device 16.

While described above with respect to this highly involved form of transformation, MEP module 46 may configure other types of less involved forms of transformation. For example, MEP module 46 may specify bridge configuration parameters 64B to configure a higher-layer bridge 36B that transforms formatted multimedia content 78A by re-encapsulating, either partially or wholly, formatted multimedia content 78A. Re-encapsulating content 78A may only involve updating headers appended to portions of multimedia content 78A without otherwise changing the format of content 78A. In this example, MEP 40 may configure a single one of video codecs 38 to perform this re-encapsulation.

As another example, MEP module 46 may specify bridge configuration parameters 64B to configure a higher-layer bridge 36B that transforms formatted multimedia content 78A by trans-rating formatted multimedia content 78A. Trans-rating content 78A may only involve a single one of video codecs 38, where this one of video codecs 38 translates content 78A by dropping frames or re-quantizing video content 78A without otherwise editing the format of content 78A.

In yet another example, MEP module 46 may specify bridge configuration parameters 64B to configure a higher-layer bridge 36B that transforms formatted multimedia content 78A by trans-coding formatted multimedia content 78A. Trans-coding content 78A may involve at least two of video codecs 38, where one of these two video codecs decodes content 78A coded according to one coding technique/format (e.g., MPEG2) and the other one of these two video codecs re-encodes the decoded content in accordance with a different coding technique/format (e.g., H.264). This transcoding may further involve scaling the multimedia content, e.g., for different format sizes, as described above.

Each of these various forms of transformation may consume different levels of resources and provide certain benefits. Re-encapsulation may be the most power efficient (with respect to mobile device 12) transformation of the transformations described in this disclosure, but re-encapsulation may not provide a very high Quality of Experience (QoE) for certain applications and/or devices. Trans-rating may improve the QoE but also consume more power and other resources when compared to re-encapsulation. Transcoding may further improve on the QoE obtained by way of trans-rating, but consume yet even more resources than consumed by trans-rating. Transcoding with additional post- and pre-processing and possibly content editing, as described above with respect to FIG. 2B, may provide the best QoE with respect to the transformations described herein, but may further increase resource utilization. MEP module 46 may therefore select and specify bridge configuration parameters 64B to perform a suitable transformation given the above sets of data 80, 82, and 84 as well as the data determined from profiles 48.

Figure 3:
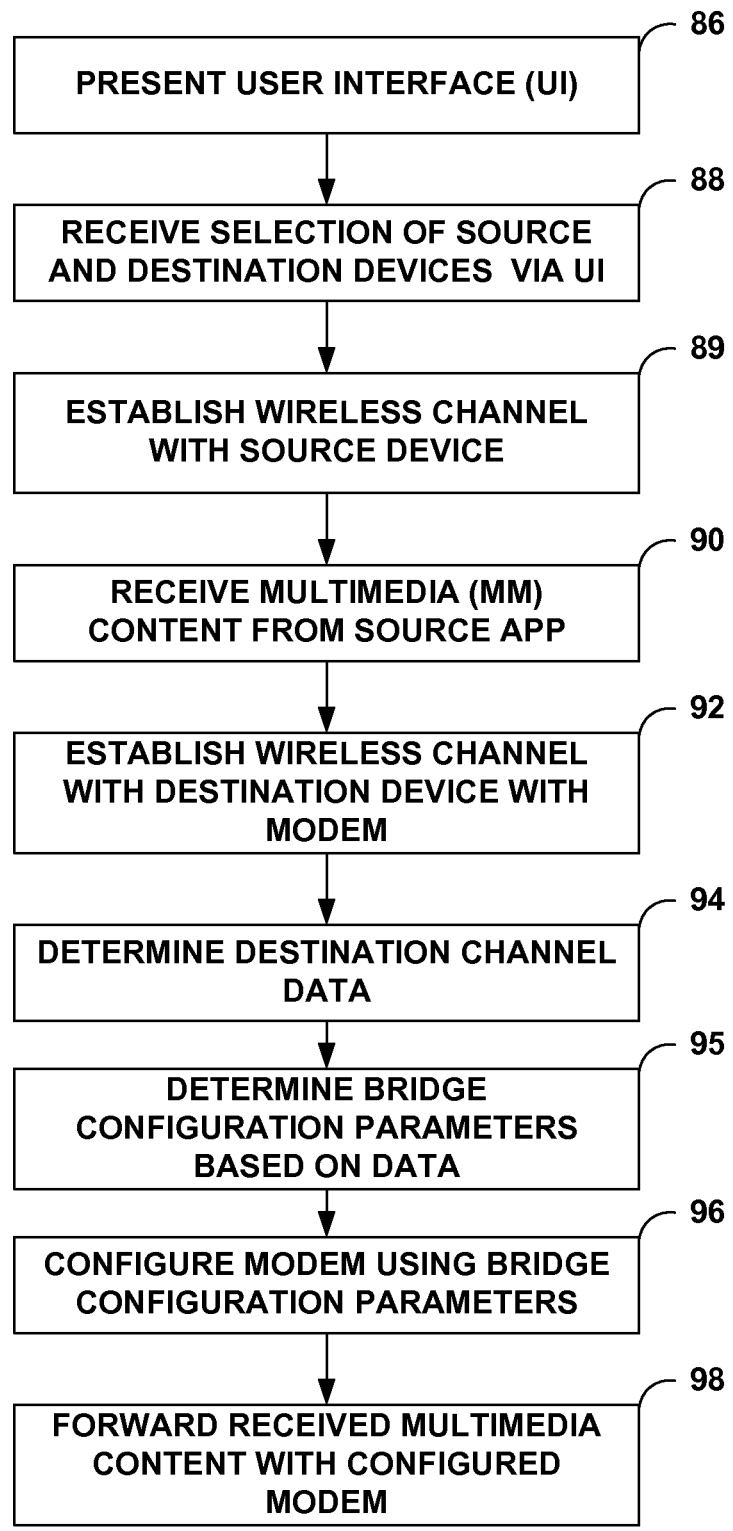
FIG. 3 is a flowchart illustrating example operation of a device that implements a Multimedia Management System (MMS) to configure a lower-layer bridge in accordance with the techniques described in this disclosure.

FIG. 3 is a flow chart illustrating example operation of a device that implements a Multimedia Management System (MMS) to configure a lower-layer bridge in accordance with the techniques described in this disclosure. For purposes of illustrating this aspect of the techniques, this aspect is described with respect to mobile device 12, as shown in FIG. 2A. While described relative to this particular device 12, the techniques may be implemented by any device capable of wireless communication with two or more devices.

Initially, control unit 50 of mobile device 12 and, more particularly, MMS 34 within control unit 50 may employ UI module 52 to present a user interface to a user of mobile device 12 (86). The user interface may prompt the user to determine whether the user would like to establish a lower-layer bridge between a source device/application, such as source device 14 of FIG. 1, and a destination device/application, such as destination device 16. Assuming the user enters input indicating that the user would like to establish such as bridge, UI module 52 may forward this response to LMP module 44 of MMS 34. LMP module 44 may then interface with modems 40 to determine any devices that support the form of wireless communication supported by each of modems 40. In effect, LMP module 44 may discover devices within range of wireless modems 40.

Notably, some of these devices may comprise access points to larger networks, such as the Internet, in which still other more remote devices reside. Often, by discovering these access point devices, mobile device 12 may access and/or deliver content from and/or to devices that reside outside of the immediate range of wireless modems 40. For example, one of modems 40 may discover a Wireless Access Point (WAP) that provides a wired or wireless connection to a public network, such as the Internet. LMP 40 may discover additional devices, such as video servers, by accessing the Internet via the WAP. The techniques should not be limited therefore to those devices within range of wireless modems 40 but may include any device that may be accessed via one or more devices within the range of one or more of wireless modems 40.

In any event, upon discovering these devices, LMP module 44 may return a list of devices to UI module 52 which may present via the same or another user interface the list of devices. The user may then select one of the devices from the list as a source device, e.g., a provider or source of multimedia content, and another one of the devices of the list as a destination device, e.g., a target or destination for the multimedia content provided by the selected source device. UI module 52 may receive these selections of the source and destination devices via the presented user interface and forward these selection to LMP module 44 (88). LMP module 44 may then select one or more of modems 40 by which to communicate with the source device and the destination device and establish source wireless communication channel 13 with the selected source device, e.g., source device 14 in the manner described above (89).

Via source communication channel 13, the one of wireless modems 40 may receive RF signals representative of multimedia content from source application 18 (90). In the example of FIG. 2A, wireless modem 40A receives the RF signal representative of the multimedia content, where RFFE unit 54A reconstructs the multimedia content from the RF signal and passes this reconstructed multimedia content to baseband processor 56A, which decodes the channel/inner codes embedded in the multimedia content, as described above. Baseband processor 56A may then forward this partially decoded multimedia content to MAC unit 58A, which decodes the outer codes embedded in the multimedia content and reconstructs the multimedia content from the partially decoded multimedia content.

LMP module 44 may communicate with this wireless modem 40A and, more specifically, baseband processor 56A and MAC unit 58A, to determine source channel data 66, as described above. LMP module 44 may, in some aspects, determine one or more bridge configuration parameters 64A to adapt wireless modem 40A to optimize receipt of the multimedia content in light of particular channel characteristics defined by source channel data 66, as described above.

LMP module 44 may meanwhile communicate with the one of wireless modems 40 that established destination communication channel 15, e.g., modem 40N in FIG. 2A, to establish destination communication channel 15, as described above (92). LMP module 44, as described above, may further communicate with this modem 40N to determine destination channel data 62 (94). Based at least on this destination channel data 62, LMP module 44 may determine one or more of bridge configuration parameters 64A to adapt wireless modem 40N to overcome or otherwise optimize delivery of the multimedia content in light of particular channel characteristics defined by destination channel data 62, again as described above (95). LMP module 44 may not only select bridge configuration parameters 64A to optimize modem 40N or both modem 40A and 40N to overcome certain channel characteristics, but also to promote efficient power consumption or otherwise to facilitate efficient operation of mobile device 12.

In any event, LMP module 44 may interface with modem 40N or both of modems 40A and 40N to configure these one or more modems using bridge configuration parameters 64A, as described above (96). After configuring one or more of modems 40 and, particularly modem 40N, in this manner, this configured modem 40N may forward the received multimedia content via destination communication channel 15 to destination device 16 (98). The term "forwarding" as used herein should not be construed as forwarding strictly the received multimedia content in the format in which this content was received buy may also involve forwarding the received multimedia content in a format different from that in which this content was received. This transformation may occur in the high-level portion of the multimedia bridge as described above. Consequently, "forwarding" the received multimedia content may comprise forwarding a transformed version of the received multimedia content as well as forwarding the received multimedia content in the same format in which this content was received.

In instances, where MMS 34 includes only LMP module 44 to configure lower-layer bridge 36A, LMP module 44 may configure modem 44A to communicate the decoded multimedia content directly to modem 40N through a switch or other hardware mechanism. In some instances, the control unit 50 may provide the switching mechanisms either in hardware or as a combination of hardware and software. In these instances, multimedia bridge 36 shown in FIG. 1 may comprise lower-layer bridge 36A and not include higher-layer bridge 36B.

Alternatively, in instances where MMS 34 includes both LMP module 44 and MEP module 46, as shown in FIGS. 1, 2A, and 2B, LMP module 44 may configure modem 40N to forward the channel decoded multimedia content to control unit 50 for further transformation. MEP module 46 may configure a higher-layer bridge 36B to perform this further transformation, as described above. In these instances, multimedia bridge 36 may comprise both lower-layer bridge 36A and higher-layer bridge 36B. Yet, as MMS 34 may include LMP module 44 and not MEP module 46 so may MMS 34 include MEP module 46 and not LMP module 44. In this instance, multimedia bridge 36 may only comprise higher-layer bridge 36B, as described below.

Figure 4:
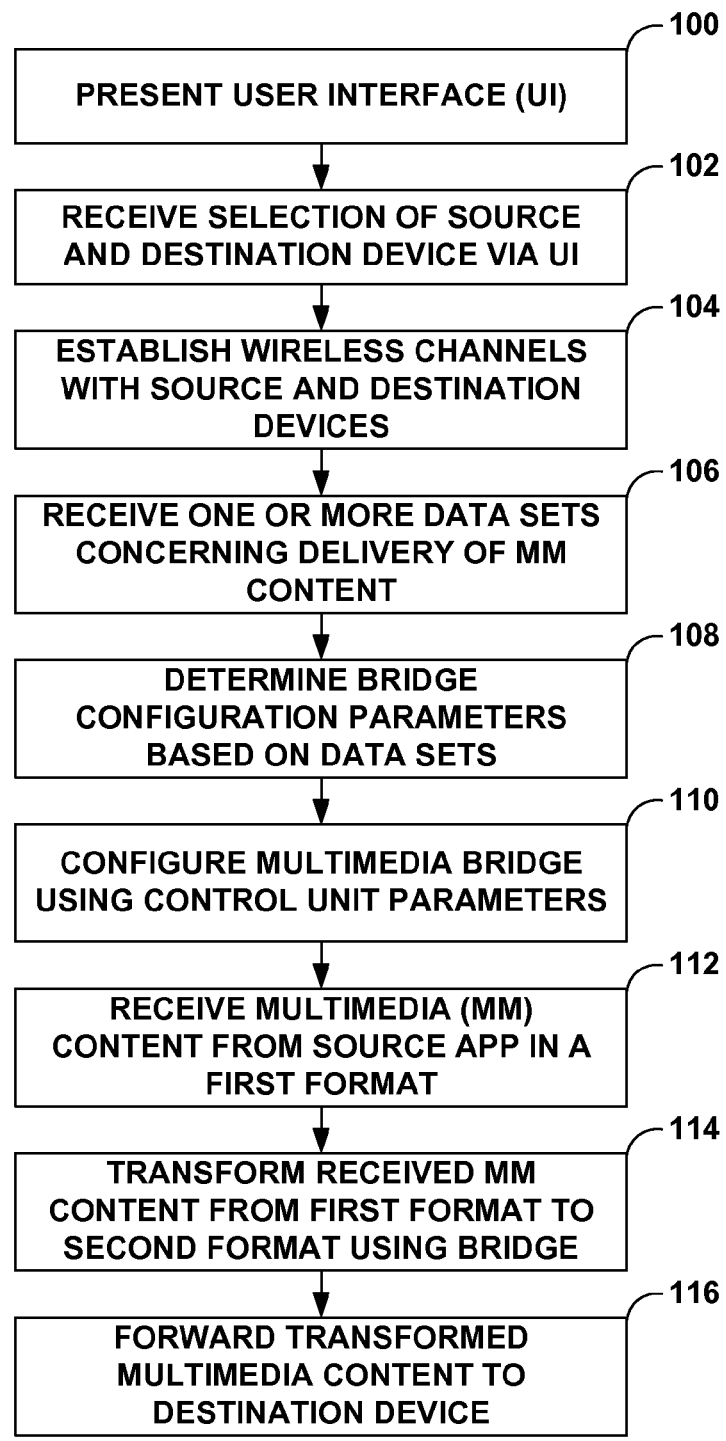
FIG. 4 is a flowchart illustrating example operation of a device that implements a Multimedia Management System (MMS) to configure a higher-layer bridge in accordance with the techniques described in this disclosure.

FIG. 4 is a flowchart illustrating example operation of a device that implements a Multimedia Management System (MMS) to configure a higher-layer bridge in accordance with the techniques described in this disclosure. For purposes of illustrating this aspect of the techniques, this aspect is described with respect to mobile device 12, as shown in FIG. 2B. While described relative to this particular device 12, the techniques may be implemented by any device capable of wireless communication with two or more devices.

Initially, control unit 50 of mobile device 12 and, more particularly, MMS 34 within control unit 50 may employ UI module 52 to present a user interface to a user of mobile device 12 (100). The user interface may prompt the user to determine whether the user would like to establish a higher-layer bridge between a source application, such as source application 16 of FIG. 1, and a destination application, such as destination application 32. Assuming the user enters input signaling that the user would like to establish such as bridge, UI module 52 may forward this response to MEP module 46 of MMS 34 (not shown in FIG. 2B). LMP module 44 may then interface with modems 40 to determine any devices that support the form of wireless communication supported by each of modems 40. In effect, LMP module 44 may discover devices within range of wireless modems 40.

Again, some of these devices may comprise access points to larger networks, such as the Internet, in which still other more remote devices reside. Often, by discovering these access point devices, mobile device 12 may access and/or deliver content from and/or to devices that reside outside of the immediate range of wireless modems 40. For example, one of modems 40 may discover a Wireless Access Point (WAP) that provides a wired or wireless connection to a public network, such as the Internet. MEP module 46 may discover additional devices, such as video servers, by accessing the Internet via the WAP. The techniques should not be limited therefore to those devices within range of wireless modems 40 but may include any device that may be accessed via one or more devices within the range of one or more of wireless modems 40.

In any event, upon discovering these devices, MEP module 46 may return a list of devices to UI module 52 which may present via the same or another user interface the list of devices. The user may then select one of the devices of the list as a source device, e.g., a provider or source of multimedia content, and another one of the devices of the list as a destination device, e.g., a target or destination for the multimedia content provided by the selected source device. UI module 52 may receive these selections of the source and destination devices via the presented user interface and forward these selection to MEP module 46 (102). MEP module 46 may then select one or more of modems 40 by which to communicate with the source device and the destination device and cause these one or more of modems 40 to establish source communication channel 13 with the selected source device, e.g., source device 14 in the manner described above and destination communication channel 15 with the selected destination device, e.g., destination device 16 (104).

After or while establishing these channels 13, 15, MEP module 46 may determine one or more sets of data 82, 84, 86, as well as data from one or more of profiles 48, each of which concern delivery of formatted multimedia content 78A to destination device 16 (106). That is, header data 80 may comprise data concerning multimedia content received via source communication channel 13 that indicates, for example, an intended application of the multimedia content and thereby impacts delivery of this received multimedia content. Channel data 82 may describe characteristics of destination communication channel 15 and thereby impacts or concerns delivery of this content via destination channel 15. Resource data 84 may comprise data describing resource utilization within mobile device 12 and thereby impact or concern the ability of mobile device 12 to deliver the received content. Data extracted from one or more of profiles 48 may also impact or concern delivery in that this may indicate formats acceptable by destination device 16.

Based on these one or more sets of data 82, 84, 86 and data sets extracted from one or more of profiles 48, MEP module 46 may determine bridge configuration parameters 64B to as to optimize delivery of multimedia content to destination device 16, as described above (108). MEP module 46 may next interface with one or more of video codecs 38, post- and pre-processor units 72A, 72B and editor unit 74 to configure higher-layer bridge 36B using bridge configuration parameters 64B, as described above (110). Often, MEP module 46 interfaces with these components via APIs presented by each of these components.

Via source communication channel 13, the one of wireless modems 40 that established source communication channel 13, e.g., source modem 40A, may receive formatted multimedia content from source application 16 that is encoded in accordance with a first format and forward this content to control unit 50 as formatted multimedia content 78A, as described above (112). Notably, some of the sets of data, e.g., header data 80, may be extracted from this received multimedia content 78A and therefore the steps as shown in FIG. 4 should not be construed as successive steps for each example of the techniques set forth in this disclosure. Rather, the steps may occur in any conceivable order consistent with the various aspects described in this disclosure. The techniques therefore should not be limited to the example described with respect to FIG. 4A.

Higher-layer bridge 36B configured within control unit 50 may receive formatted multimedia content 78A and transform formatted multimedia content 78A from the first format to a second, different format, as described above (114). Once transformed, higher-layer bridge 36B may output this transformed multimedia content as formatted multimedia content 78B to modem 40N, which may then forward this transformed multimedia content to destination device 16 via destination communication channel 15 (116). In this manner, the techniques may facilitate real-time and/or power efficient transfer of multimedia content encoded in accordance with a first format received from a source device or application to a destination device or application that does not support the first format but does support the second format.

While described as configuring multimedia bridge 36 once and then performing the transformation of the multimedia content from a first format to a second format, MMS 34 may continually define and re-define both new and old bridge configuration parameters 64. In this respect, MMS 34 may monitor the transformation in real-time and adaptively adjust bridge configuration parameters so as to dynamically optimize multimedia bridge 36 to suit a particular context, e.g., application, channel, content encoding, device resource utilization and other variables associated with providing the real-time bridge. The techniques therefore should not be limited to the examples provided in this disclosure.

Figure 5:
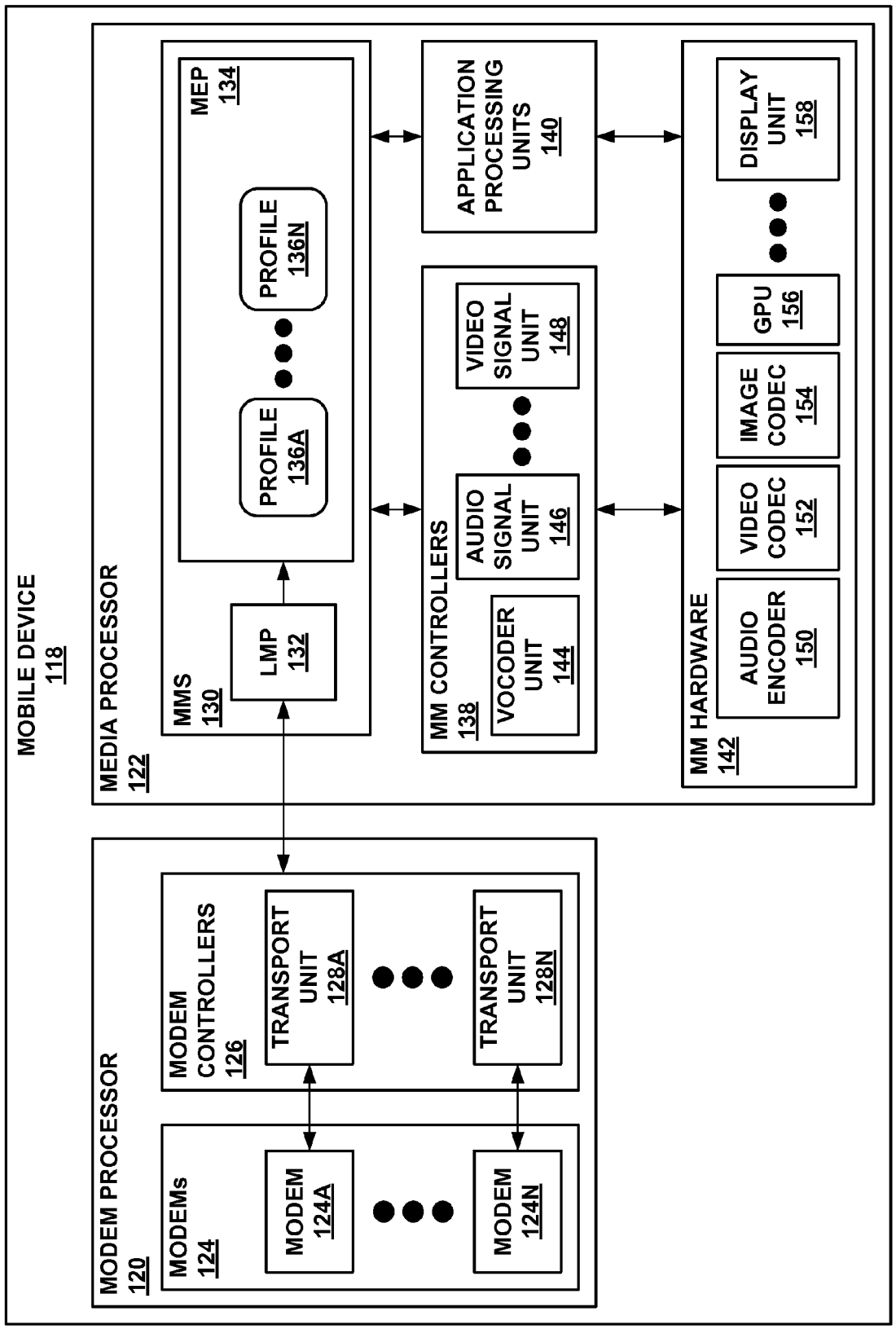
FIG. 5 is a block diagram illustrating an exemplary implementation of a mobile device that implements the techniques described in this disclosure.

FIG. 5 is a block diagram illustrating an exemplary implementation of a mobile device 118 that implements the techniques described in this disclosure. As shown in the example of FIG. 5, mobile device 118 includes a modem processor 120 and a media processor 122. Modem processor 120 may comprise one or more processors or co-processors that collectively implement modems 124 and modem controllers 126. Modems 124 may comprise a plurality of modems 124A-124N, while modem controllers 126 may comprise a plurality of transport units 128A-128N ("transport units 128"). One of modems 124 may couple to a respective one of transport units 128 in the manner shown in FIG. 5. Combined, each of these coupled modems 124 and transport units 128 may comprise what is shown in FIGS. 1, 2A, and 2B as modems 40. Thus, modem processor 120 may represent one or more processors that implement a plurality of modems.

Media processor 122 may implement MMS 130 which may be substantially similar to MMS 34. MMS 130, similar to MMS 34, includes an LMP module 132 ("LMP 132") and an MEP module 134 ("MEP 134"). MEP 134 further includes a plurality of profiles 136A-136N ("profiles 136") similar to profiles 48. Media processor 122 may also include multimedia controllers 138 ("MM controllers 138"), application processing units 140, and multimedia hardware 142 ("MM hardware 142").

Multimedia controller 138 may provide one or more interfaces, e.g., APIs, to MM hardware 142. Multimedia controller 138 may, for example, include a voice encoder or "vocoder" unit 144, an audio signal unit 146, a video signal unit 148, as well as, additional units that provide an interface to various multimedia hardware 142. Multimedia controllers 138 commonly include one or more Digital Signal Processors (DSPs) that provide high-level processing of multimedia content and in interface to lower layer multimedia hardware 142. Application processing units 140 may comprise one or more processing units that implement or otherwise represent a post-/pre-processor, such as post-/pre-processor unit 72A of FIG. 2A, and an editor unit, such as editor unit 74. Multimedia hardware 142 may comprise dedicated hardware designed to provide many multimedia operations. Multimedia hardware 142 may, for example, comprise audio encoder hardware 150 ("audio encoder 150"), video codec hardware 152 ("video codec 152"), image codec hardware 154 ("image codec 154"), a graphics processing unit 156 ("GPU 156") and a display unit hardware 158 ("display unit 158"), as well as, any other types or form of multimedia hardware for encoding or decoding audio, video, images, voice, or other form or type of multimedia content.

In accordance with various aspects of the techniques described in this disclosure, LMP 132 may communicate with modem processor 120 and, more particularly, modem controllers 126 of modem processor 120. LMP 132 may include an API or other interface ("not shown in FIG. 5") by which to communicate with modem controllers 126 to collect data concerning source and destination channels, such as source channel data 66 and destination channel data 62 of FIG. 2A. LMP 132 may utilize this interface to then configure one or more of modems 124 via modem controllers 126 based at least on the destination channel data. By so configuring these one or more of modems 124, LMP 132 may configure a lower-layer bridge, such as lower-layer bridge 36A, as described above.

MEP 134 may determine the above described sets of data, including the set of data extracted from profiles 136, and determine bridge configuration parameters, such as bridge configuration parameters 36B of FIG. 2B. Profiles 136, and the before described profiles 48, may comprise profiles listing characteristics of devices and/or particular multimedia applications or ecosystems. As an illustration, profile 136A may comprise a wireless display or WD profile that defines standardized and/or, in some instances, manufacturer-specific characteristics of WDs. Example manufacturer-specific characteristics may include resolution scaler parameters and display parameters, such as color gamut, contrast ration, color depth, and two-dimensional capabilities versus three-dimensional capabilities (or stereoscopic capabilities). Profile 136B may comprise a social network profile that defines characteristics of widely used social networks. Profile 136C may comprise a media capture device profile that defines standardized and/or, in some instances, manufacturer specific characteristics of media capture devices (e.g., a camcorder). Profile 136D may comprise a personal media player or PMP profile that defines standardized and/or, in some instances, manufacturer specific characteristics of PMP devices (e.g., an MP3 player). Profile 136N may comprise a gaming profile that defines standardized and/or, in some instances, manufacturer specific characteristics of gaming devices (e.g., such as handheld gaming devices).

MEP 134 may then determine bridge configuration parameters in addition to those bridge configuration parameters determined by LMP 132 based on one or more sets of the data described above. MEP 134 may invoke one or more of multimedia controllers 138 to configure MM hardware 142 with the determine bridge configuration parameters. MEP 134 may also load one or more of the bridge configuration parameters into MM controllers 138 and, additionally, may interface with application processing units 140 to configure application processing units 140 and/or underlying multimedia hardware 142 using the bridge configuration parameters in the manner described above. In this manner, MEP 134 may configure a higher-layer bridge within a control unit, such as media processor 122, of mobile device 118.

Figure 6:
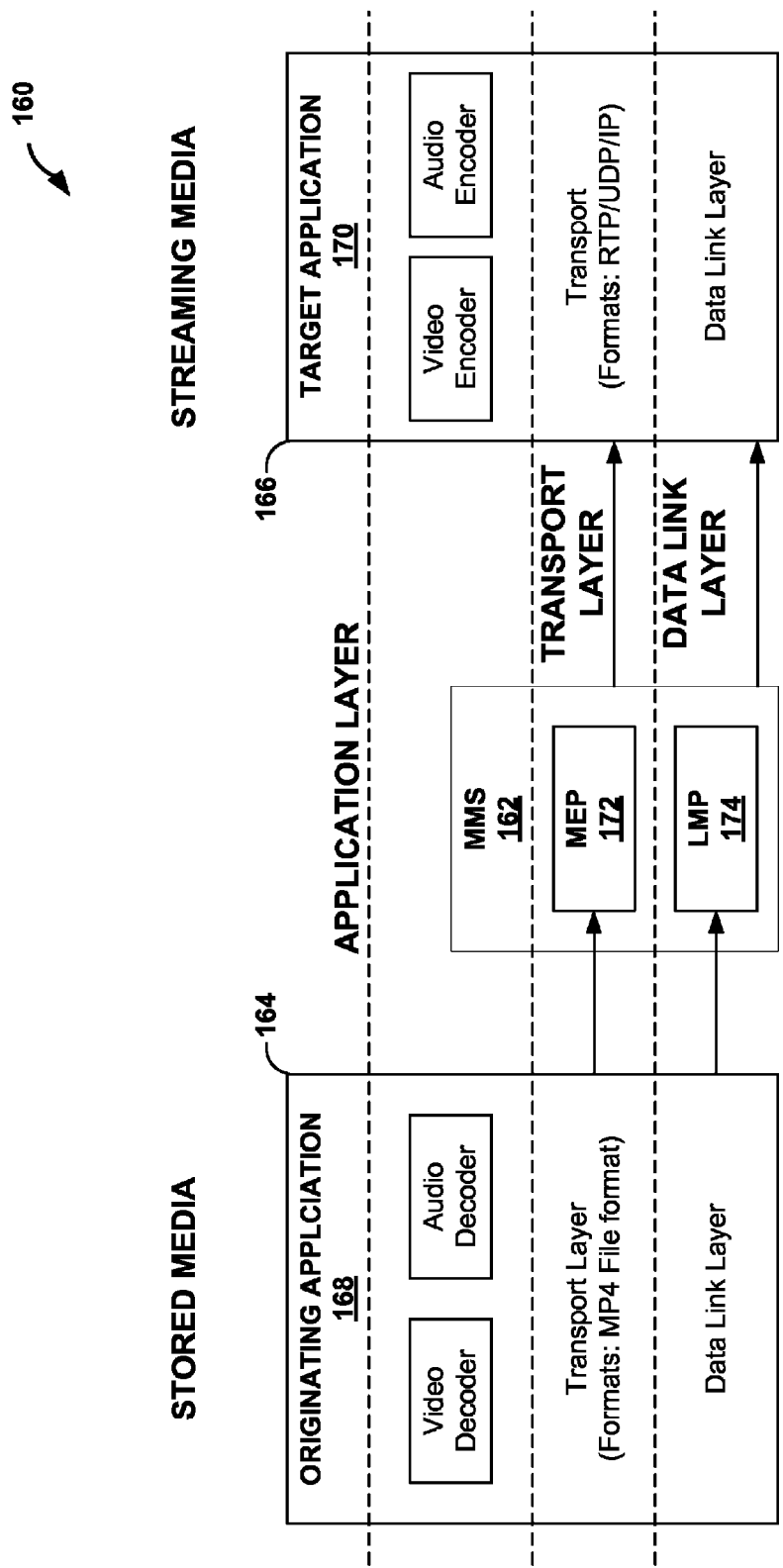
FIG. 6 is a block diagram illustrating a conceptual view of a system in which an MMS implements the techniques described in this disclosure to transform media in a first exemplary format to a second exemplary format.

FIG. 6 is a block diagram illustrating a conceptual view of a system 160 in which an MMS 162 implements the techniques described in this disclosure to transform media in a first exemplary format to a second exemplary format. In the example of FIG. 6, an originating or source device 164 and a destination or target device 166 are segmented by functionality into three layers of the OSI model. These three layers are, from top to bottom, the application layer, the transport layer and the data link layer. Executing in the application layer within origination device 164 is an originating application 168. Originating application 168 may implement a multimedia application that stores multimedia and this is depicted in FIG. 6 by the "stored media" label above origination device 164. Executing in the application layer within is a target application 170 is target application 170. Target application may implement a multimedia application that stream multimedia content and this is depicted in FIG. 6 by the "streaming media" label above target device 166.

Below originating and target applications 168, 170 within originating device 164 and target device 166, respectively, are video and audio decoders and encoders, respectively. These decoders and encoders may process information from originating and target applications 168 and 170, respectively, to facilitate the storing and streaming application to which each of originating and target devices 164, 166 are dedicated. In this respect, originating and target devices 164 and 166 may represent dedicated multimedia devices that each provide a dedicated or fixed set of functions or operation. Originating device 164 may, for example, comprise a camcorder or digital media player that stores multimedia. Target device 166 may comprise a dedicated device for streaming multimedia, such as a satellite radio device, a wireless television, and a Voice over IP (VoIP) device or telephone.

With respect to the transport layer, originating device 164 supports the above described MP4 file format while target device 166 supports the RTP, UDP and IP transports. In this example, originating device 164 supports a different set of transports that does not overlap with those supported by target device 166. Accordingly, originating device 164 may be considered to be a part of a different multimedia ecosystem than target device 166. Below the transport layer is the data link layer. While types of modems are not explicitly specified with respect to this data link layer, each of originating and target devices 164, 166 may likewise support or otherwise include different types of modems, further differentiating the two disparate multimedia ecosystems to which these devices 164, 166 belong.

As described above, MMS 162 may provide a multimedia bridge between these two devices that reside in disparate multimedia ecosystems. MMS 162 may include MEP 172 that performs the operations described above to construct a higher-layer bridge that bridges, in the example shown with respect to FIG. 6, different transport layer formats. MMS 162 may also include LMP 174 that performs the operations described above to construct a lower-layer bridge that bridges, in the example shown in FIG. 6, different data link layer protocols. The higher-layer bridge is therefore "higher" than the lower-layer bridge with respect to the layers of the OSI model. While described with respect to the transport and data link layers of the OSI model, the techniques may be implemented with respect to any two or more layers of the OSI model.

Figure 7:
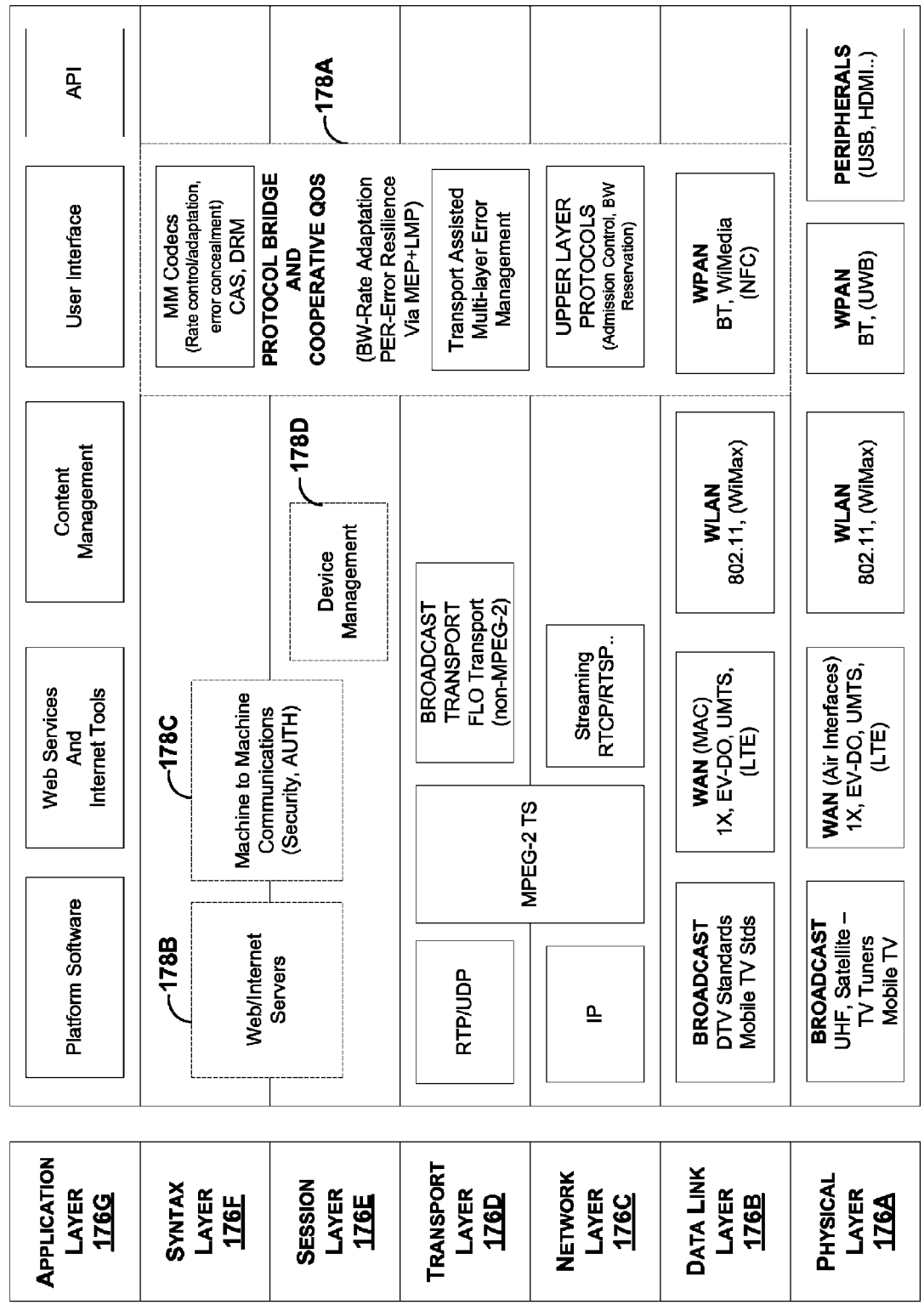
FIG. 7 is a block diagram illustrating functions of an example MMS arranged in accordance with protocol layers of the OSI model.

FIG. 7 is a block diagram illustrating functions of an example MMS arranged in accordance with protocol layers of the OSI model. As shown in the left-side of the example of FIG. 7, the seven layers of the OSI model are listed as layers 176A-176G ("layers 176"). On the right-side of the example of FIG. 7, functions of a mobile device that implements an MMS are shown divided into the respective one of layers 176.

Layer 176A comprises the lowest layer of the seven and is referred to as physical layer 176A. Typically, operations that reside in physical layer 176A include modulation and channel coding in preparation for interfacing with a communication medium. Layer 176B is directly above layer 176A and is referred to as data link layer 176B. To comply with data link layer 176B, operations are typically performed to handle medium access and implement FEC. Layer 176C is directly above layer 176B in the OSI model and is referred to as network layer 176C. To comply with network layer 176C, typically operations are performed to enable or otherwise facilitate routing, forwarding, addressing, internetworking, error handling, congestion control, and packet sequencing. Above layer 176C is layer 176D, which may be referred to as transport layer 176D.

Operations included within transport layer 176D comprise transparent data transfer (e.g., transparent to operations above layer 176D) and end-to-end error recover and flow control. Above layer 176D is layer 176E, which may be referred to as session layer 176E. Session layer 176E may include operations to enable or otherwise facilitate connection coordination. Layer 176F is above layer 176E in the OSI model, where layer 176F may be referred to a presentation or syntax layer 176F. Syntax layer 176F may include operations to enable or otherwise facilitate encryption, synchronization and coding and decoding. Over layer 176F may reside the highest layer, layer 176G, which may be referred to as application layer 176G. Within application layer 176G may reside applications.

With respect to these layers 176, various operations or functions are shown to the right of these layers. These functions may correspond to functions performed by a mobile device that implements an MMS in accordance with the techniques described in this disclosure, such as mobile device 12 of FIGS. 1-2 and/or mobile device 118 of FIG. 5. To illustrate, within physical layer 176A may reside operations typically performed by various broadcast tuners, Wireless Access Network (WAN) interfaces, Wireless Local Area Network (WLAN) interfaces, Wireless Personal Area Network (WPAN) interfaces, and peripheral interfaces. Within data link layer 176B may reside functions performed by broadcast standards, WAN interfaces, WLAN interfaces and WPAN interfaces. Within network layer 176C may reside functions performed by the Internet Protocol (IP), portions of MPEG-2 Transport Stream (TS), and streaming protocols, including a Real-time Transfer Protocol (RTP) Control Protocol (RTCP) and a Real-Time Streaming Protocol (RTSP). Within layer 176D may reside functions performed by RTP/UDP, portions of the MPEG-2 TS, and broadcast transport protocols, including Forward Link Only (FLO) transport protocol (which is a non-MPEG-2 transport protocol). Functions within both session layer 176E and syntax layer 176F are described below with respect to functions implemented by the MMS. Within application layer 176G reside functions performed by a plurality of applications, such as platform software, web services and Internet tools, content management, user interfaces and Application Programmer Interfaces (APIs).

Notably, MMS functions are represented by a dashed box shown in FIG. 7 as protocol bridge and cooperative QoS functions 178A ("MMS functions 178A"). Additional MMS functions are also shown in FIG. 7 as MMS functions 178B-178D, which are also denoted by a dashed box. MMS functions 178A spans layers 176B-176D and 178F and may represent functions performed by an MMS that implements both MEP and LMP in accordance with the techniques described in this disclosure. As explained above, the techniques should not be limited to this example insomuch that an MMS may implement only one of MEP and LMP.

MMS functions 178A includes functions that reside in data link layer 176B (such as WPAN functions), network layer 176C (such as admission control and bandwidth reservation functions of upper layer protocols), transport layer 176D (such as transport assisted multi-layer error management functions), and syntax layer 176F (such as rate control/adaption, error concealment, and Digital Rights Management (DRM) functions of multimedia codecs. MMS functions 178B include functions typically performed by a web/Internet servers. MMS functions 178C may include functions typically required to facilitate machine-to-machine communications, such as encryption, authorization, and authentication. MMS functions 178D may include functions involving device management.

An MMS, such as MMS 162 of FIG. 6, may implement these various functions to provide a protocol bridge with cooperative QoS to facilitate inter-multimedia ecosystem communication. MMS 162 may operate within these various layers to provide a cohesive bridge that spans layers 176 in the above described manner so as to optimize delivery of multimedia content between multimedia ecosystems. This optimization may involve, as described above, optimization directed to achieving efficient real-time transfer of multimedia content between devices of disparate multimedia ecosystems. In addition or alternatively, this optimization may involve, again as described above, optimization directed as efficient utilization of device resources, such as available power. This power efficient optimization may be particularly beneficial with respect to mobile devices that implement the MMS.

Figure 8:
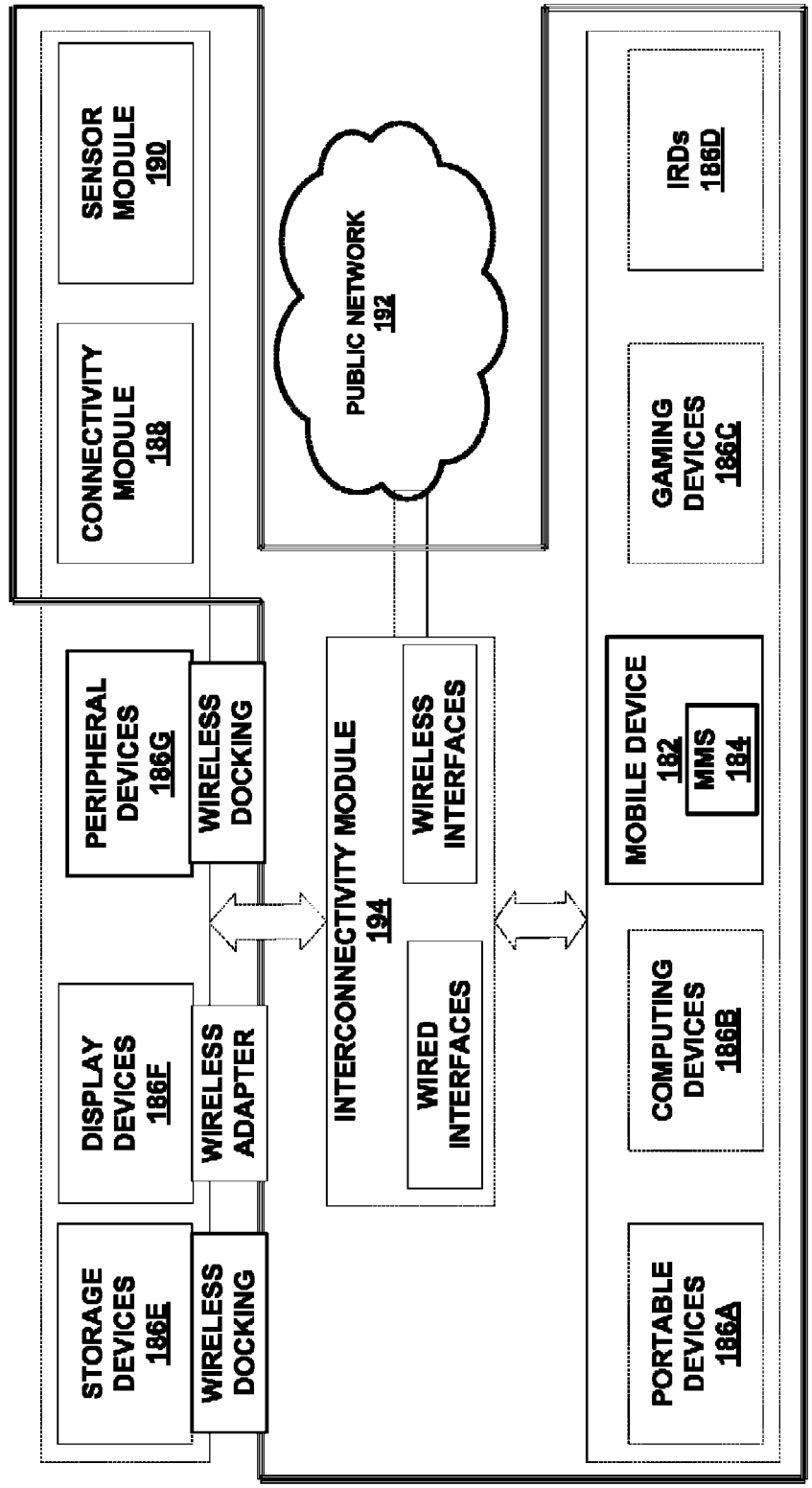
FIG. 8 is a block diagram illustrating an example system in which a mobile device implements an MMS in accordance with the techniques described in this disclosure.

FIG. 8 is a block diagram illustrating an example system 180 in which a mobile device 182 implements an MMS 184 in accordance with the techniques described in this disclosure. By implementing MMS 184, mobile device 182 may, in effect, act as a multimedia router to facilitate communication of multimedia content between one or more of a first set of devices 186A-186D and one or more of a second set of devices 186E-186G. MMS 184 may also facilitate communication with a connectivity module 188 and a sensor module 190, as well as, a public network 192, such as the Internet.

The example of FIG. 8 represents a conceptual diagram of system 180 in which these devices 186A-186D are shown coupling to Devices 186E-186G, connectivity module 188, sensor module 190 and public network 192 via interconnectivity module 194. This is a conceptual representation in that mobile device 182 may provide interconnectivity module 194, which MMS 184 may configure in accordance with the techniques described herein to provide an optimized form of interconnectivity over conceptual interconnectivity module 194.

MMS 184 may provide interconnectivity between one or more of the first set of devices 186A-186D and one or more of the second set of devices 186E-186G. Devices 186A-186G ("devices 186") may comprise portable devices, computing devices, gaming devices, an Independent Receiver/Decoder (IRD), storage devices, display devices, and peripheral devices, respectively. One or more of storage devices 186E and peripheral devices 186G may comprise a wireless docking module that provide a wireless interface by which to interact with these devices 186E, 186G for device that are customarily accessed by way of wired interfaces. Display devices 186F may also comprise a wireless adapter by which to provide a wireless, not wired, interface by which to interface with other devices.

Connectivity module 188 may comprise a module that provides for connectivity between two devices and therefore represents a module that provides connectivity between interconnectivity module 194 and another device not shown in FIG. 8. Sensor module 190 may represent a module that includes a sensor, such as a camcorder and/or a microphone, as two examples. In any event, MMS 184 may provide interconnectivity module 194 to interconnect either by way of wired interfaces or wireless interfaces any one or more of each of the first and second sets of devices 186 in the manner described above.

For example, MMS 184 may discover each of devices 186, connectivity module 188 and sensor module 190 via interconnectivity module 194. MMS 184 may further be configured to detect public network 192 and prompt a user or other operator of mobile device 182 for an address, such as a web or Internet address in the form of a Uniform Resource Locator (URL) or HTTP address, of a multimedia server within public network 192. Alternatively, MMS 184 may be preconfigured to access a select multimedia server, such as a video or data server, within public network 192. In any event, mobile device 182 may present a user interface with which a user may interact to select two or more of these devices from a list.

Assuming the user selects one of computing devices 186B and one of display devices 186F, MMS 184 may establish the above described multimedia bridge between these two devices and optimize this bridge so as to facilitate a particular application, e.g., real-time streaming, and reduce power consumption. MMS 184 may configure the bridge seamlessly in this respect as the user need not further interact with MMS 184 to configure the bridge. The user may, however, continue to interact with mobile device 182 to select the source content and otherwise prompt the one of computing devices 186B to begin transmitting the multimedia content.

In some instances, the multimedia content may comprise the current interfaces displayed by the selected one of the computing device 186B. MMS 184 may configure the multimedia bridge to efficiently transform this interface for display on the selected one of display device 186F. Moreover, MMS 184 may configure the bridge to perform this transformation to improve the visual presentation of this interface on a display device, such as a High Definition Television (HDTV).

In this respect, MMS 184 may configure the multimedia bridge to "optimize" the display of an interface generated in a first multimedia ecosystem on a device of a different, second multimedia ecosystem. For example, MMS 184 may select bridge configuration parameters in the manner described above to provide an optimal transformation given the type and/or characteristics source and destination devices and/or applications, the characteristics of the wireless channel and the types of applications for which the media is intended. In this sense, MMS 184 may "optimize" the bridge. MMS 184 may also configure the multimedia bridge to forward this interface, e.g., a user interface, in an efficient manner given the currently determined channel characteristics. In both aspects, MMS 184 may improve a quality of enjoyment by improving display of an interface on a device from a different multimedia ecosystem and optimizing delivery of the display in a manner that possibly reduces errors.

Moreover, MMS 184 may enable mobile device 182 to provide complex bridging between three or more devices in a variety of interactive ways. A user may, as described above, select these three or more devices via a user interface and, upon selecting three or more devices, MMS 184 may prompt the user via the user interface to specify the interaction of these devices desired by the user. Alternatively or in conjunction with the above active selection, MMS 184 may determine the interaction by way of context or indirectly given the type of content or other characteristic of the particular devices.

Extending the example above where one of computing device 186B provides an interface for display on one of display device 186F, it is assumed the user also selects one of portable devices 186A as well. Assuming the user makes this selection, MMS 184 may prompt the user via the user interface to specify the interaction or otherwise indirectly determine the type of interaction.

For example, if the one of portable devices 186A selected comprises an MP3 player, MMS 184 may configure the bridge to combine the audio multimedia content from the MP3 player with the interface multimedia content from the selected one of the computing devices 186B. In this instance, MMS 184 may not prompt the user for the type of interaction as MMS 184 may recognize the type of interaction from the differences in source content, e.g., one is audio and the other is video. MMS 184 may encode these together in one stream or send these separately as two or more streams. This decision to encode separately or as one may, in part, depend on the selected target or source device and/or applications, e.g., the selected one of display devices 186F, for which MMS 184 may maintain a profile. In effect, MMS 184 may layer the audio multimedia content over the interface multimedia content.

As another example, if the one of portable devices 186A selected, however, comprises a personal media player capable of playing back video and audio, unlike an MP3 player that only plays back audio, and the user selects video multimedia content to bridge to the selected on of display devices 186F, MMS 184 may prompt the user for the type of interaction. That is, MMS 184 may prompt the user for how to display both of these multimedia content on a single display device. In one aspect, MMS 184 may provide a list of display options, such as Picture-In-Picture (PIP) if supported by the selected one of display devices 186F, an "either-or" display option that enables a user to swap between the two much like changing between currently executing programs on a conventional computer, or any other display option, such as horizontally or vertically split-screen, and overlay/underlay.

In another example, a user may select two or more display devices 186F as targets and a single one of computing devices 186B as a source. MMS 184 may then prompt the user as to how to display the source multimedia content on the two or more selected ones of display devices 186F. MMS 184 may for example multicast the content to the two or more selected ones of display devices 186F for concurrent display of the source multimedia content. MMS 184 may alternatively display half of the source content on one display and half of the source content on another display. In this instance, MMS 184 may optimize each half for display on the different selected ones of display devices 186F.

While a number of examples are described above for illustrating various types and forms of connectivity, the techniques should not be limited to any one of these examples. Rather, the techniques may enable a mobile device, such as mobile device 182, to provide a multimedia bridge by which to transform source content received from one or more selected source multimedia devices and/or applications and forward this transformed source content to one or more selected destination or target multimedia devices and/or applications.

Moreover, mobile device 182 may itself comprise a display device and, in some aspects, as a peripheral device. For example, mobile device 182 may receive source content and transform this source content for display on mobile device 182 concurrent to transforming and forwarding this content to a selected one of display devices 186F. Mobile device 182 may then receive input from a user via a touch screen or other interface and update both the content received from the source device/application with, as one example, a cursor or other location identifier. With respect to mobile device 12 of FIG. 2B, editor unit 74 may introduce this identifier to generate updated multimedia content. This updated multimedia content may then be transformed and forwarded to the destination device/application which may then present the updated multimedia content. This may enable a mobile device, such as mobile device 182 to provide an accessible interface with which a user may interact with content being displayed on a device having cumbersome interfaces, such as display devices 186F.

In addition, the multimedia bridge established by MMS 184 may provide a back channel or other communications session to a source device/application to communicate with the source device/application selections made by a user or provide other interactivity with the source device/application to update, alter or change the source content currently being delivered. This may be especially useful in instances where mobile device 184 provides an interface for devices/applications having cumbersome interfaces, as MMS 184 may provide a fully functioning interface by which a user may interact with the source content.

For example, a user may access a computing device via a public network and "port" or otherwise forward this interface multimedia content to this type of limited interface display device via MMS 184 of mobile device 182. This interface multimedia content may comprise a user interface commonly generated by an operating system. MMS 184 may establish the multimedia bridge in the manner described above to present this interface multimedia content via a display device, such as one of display devices 186F. MMS 184 may incorporate within the multimedia bridge mobile device 182 to enable mobile device 182 as an interface by which a user may interact with the interface multimedia content presented via the display. As described above, MMS 184 may configure the bridge to update the interface multimedia content with a position or location identifier, such as a cursor.

The user may also select portions of the interface, such as icons on a desktop of the user interface multimedia content, whereupon MMS 184 may transmit the selection back to the source device/application using the back channel communications. In response to this selection, the computing device may update the source content, which in this example comprises interface multimedia content, to reflect the selection by the user, e.g., by updating the interface multimedia content in response to executing the selected program represented by the icon. In this sense, MMS 184 may configure the bridge to facilitate transformation and transmission of the multimedia content as well as provide an interface with which to interact with this multimedia content when displayed via the target device/application.

While described above with respect to a source or provider device and destination or target device, the techniques may be implemented, in various aspects, such that a source and/or destination devices each comprises another mobile or other device that implements the techniques described in this disclosure. In other words, one or more devices that implement the techniques, e.g., include an MMS, may be chained together one-to-one or even one-to-many in a manner whereby each MMS implements a portion of a transformation.

For example, a first MMS included within a first mobile device may communicate with a source device, whereupon the first MMS may then communicate with a second MMS included within a second mobile device. This second MMS may then communicate with a destination device. With respect to the first MMS, the second mobile device may represent a destination device insomuch that the first MMS may implement the techniques to provide a multimedia bridge between the true source device and the second mobile device. With respect to the second MMS, the first MMS may represent a source device insomuch that the second MMS may implement the techniques to provide a multimedia bridge between the first mobile device and the true destination device. Consequently, reference to a source and destination device above may refer not only to those devices described above as being source and destination device but also other device that implement the techniques described in this disclosure.

This form of chaining may enable a variety of benefits. In one instance, referring to the example above, the first and second MMSes may form a chain so as to split the transformation into two steps, thereby sharing the load in terms of resource utilization. Moreover, if one of these two MMSes reside within a mobile device while another MMS resides within a fixed device, these MMSes may configure the multimedia bridge so as to offload power consuming portions of the transformation to the one of the MMS that is fixed.

In another instance, again referring to the example above, the first and second MMSes may form a chain so as to enable transformations that a single one of the MMS could not perform alone. One MMS may not include sufficient resources to provide the optimal transformation, for example, in real-time. However, by chaining, these two MMS may be able to split the load and thereby achieve an optimal transformation. As another illustration, the first MMS may not support a particular format but the second MMS may support this particular format, while the second MMS may not be in range or capable of accessing the source device or support the format in which the source device provides the multimedia content. The first MMS may then form a chain with the second MMS so as to provide a multimedia bridge to transform the multimedia content into a format accepted by the destination device. In this respect, chaining of MMSes may be beneficial to provide a transformation and often an optimal transformation.

Figure 9:
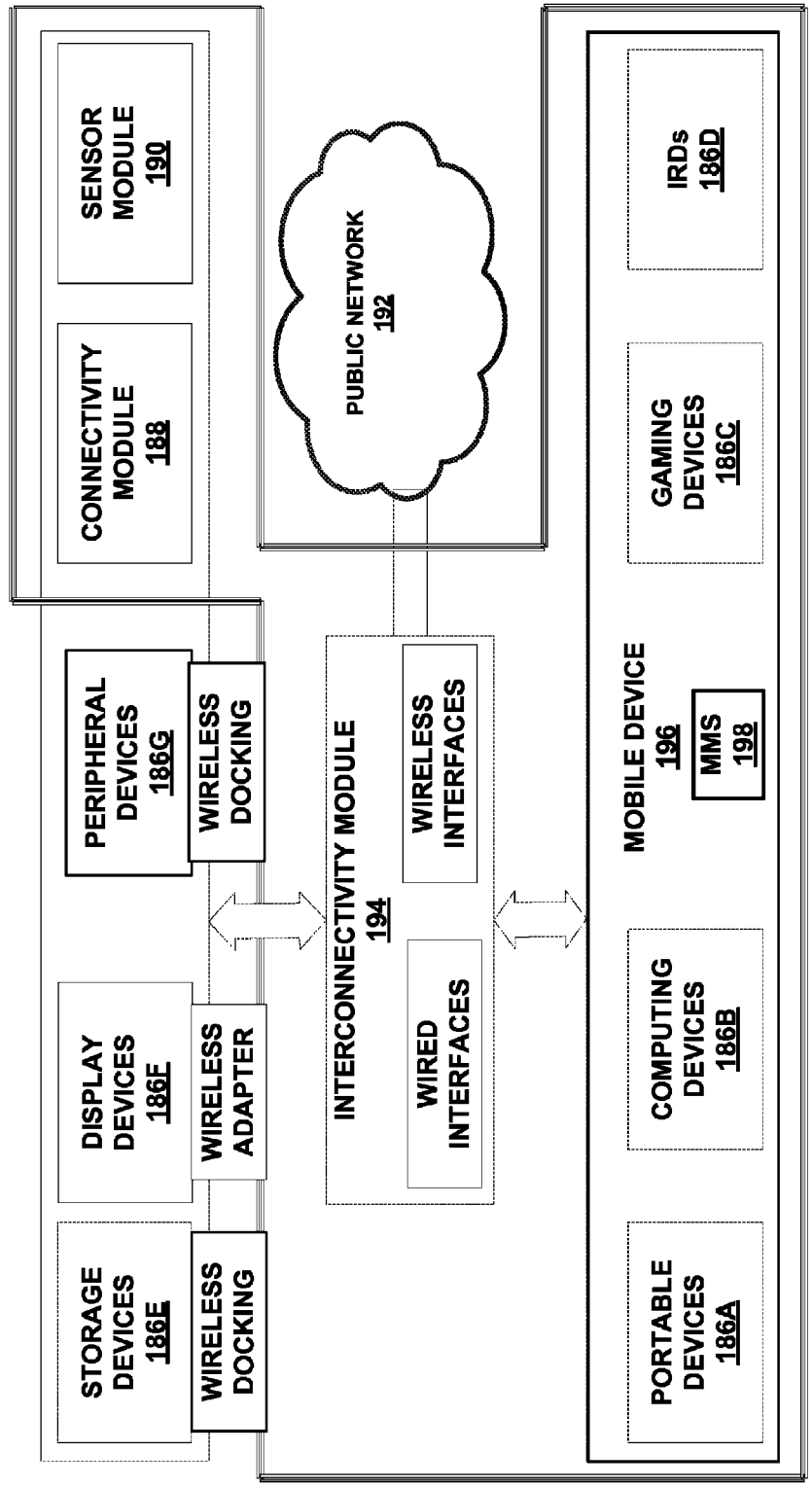
FIG. 9 is a block diagram illustrating another example system in which a mobile device implements an MMS in accordance with the techniques described in this disclosure.

FIG. 9 is a block diagram illustrating another example system 195 in which a mobile device 196 implements an MMS 198 in accordance with the techniques described in this disclosure. MMS 198 may be substantially the same as MMS 184 shown in FIG. 8. Moreover, system 195 may be substantially similar to system 180 shown in FIG. 8 except that mobile device 196 of FIG. 9 may include portable devices 186A, computing devices 186B, gaming devices 186C and IRDs 186D or the functionality thereof rather than communicate with these devices 186A-186D. In this respect, mobile device 196 may implement MMS 198 so as to provide a multimedia bridge for devices or modules that implement the functionality of these devices incorporated or included within mobile device 196. In most other respects, MMS 198 may function substantially similar to MMS 180, as described above with respect to FIG. 8.

While described herein with respect to source and destination devices throughout this disclosure, the techniques may generally apply, as described above, to a first and second application. Applications may include source and destination devices, as well as, any other application, implemented either in hardware or a combination of hardware and software, that either provides source content or consumes multimedia content. For purposes of discussion, an application that provides source content is referred to as a source application and an application that consumes source content is referred to as a destination application. These terms however should not be construed as limiting to the techniques as claimed below.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various examples of the disclosure have been described. These and other examples are within the scope of the following claims.

The invention claimed is:

1. A method comprising:
   detecting a plurality of devices;
   receiving a selection of a source device from the plurality of detected devices;
   receiving a selection of a destination device from the plurality of detected devices;
   receiving multimedia content in a first format from a first application of the source device over a first wireless communication channel established using one or more wireless modems;
   determining a plurality of formats supported by a second application of the destination device;
   determining resource data indicating a status of resources within a control unit, wherein the control unit is part of a device that is a different device than the source device or the destination device, wherein the resources comprise at least one of a power resource, a memory resource, or a storage resource of the control unit;
   selecting a second format from the plurality of formats based on the determined resource data;
   configuring a multimedia bridge between the first format and the second format; and
   transforming, with the configured multimedia bridge, the multimedia content from the first format to the second format concurrent to receiving a portion of the multimedia content;
   establishing, with the one or more wireless modems, a second wireless communication channel to communicate with the second application;
   determining channel data, wherein the channel data defines a set of characteristics associated with one or more of the first and second wireless communication channels;
   configuring the one or more wireless modems based on the channel data; and
   forwarding, with the configured one or more wireless modems, the received multimedia content to the second application.

2. The method of claim 1, wherein transforming the multimedia content comprises transforming the multimedia content from the first format to the second format substantially in real-time.

3. The method of claim 1, further comprising:
   determining header data associated with the multimedia content that defines parameters related to the first format of the multimedia content; and
   determining one or more bridge configuration parameters based on the header data,
   wherein configuring the multimedia bridge comprises interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

4. The method of claim 1, further comprising:
   determining one or more bridge configuration parameters based on the resource data,
   wherein configuring the multimedia bridge comprises interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

5. The method of claim 1, further comprising:
   determining profile data associated with one or more of the first application and the second application; and
   determining one or more bridge configuration parameters based on the profile data,
   wherein configuring the multimedia bridge comprises interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

6. The method of claim 1, further comprising:
   determining one or more bridge configuration parameters based on the channel data,
   wherein configuring the multimedia bridge comprises interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

7. The method of claim 6,
   wherein determining the channel data comprises determining the channel data with a Link Management Protocol (LMP) module of a Multimedia Management System (MMS) included within the control unit,
   the method further comprising:
   establishing, with the one or more wireless modems, the second wireless communication channel to communicate with the second application;
   configuring, with the LMP module, the one or more wireless modems based on the channel data; and
   forwarding, with the configured one or more wireless modems, the received multimedia content to the second application.

8. The method of claim 6, wherein the channel data comprises one or more of a Bit-Error-Ratio (BER), a Signal-to-Noise Ratio (SNR), and a Forward Error Correction (FEC) strength, and the method further comprising:
determining a level of bandwidth required over the first wireless communication channel to receive the multimedia content;
determining an error rate when receiving the multimedia content over the first wireless communication channel;
determining configuration parameters that provide the determined level of bandwidth with the determined error rate based on the channel data; and
interfacing with the one or more wireless modems to configure at least one of the one or more wireless modems in accordance with the determined configuration parameters.

9. The method of claim 1, wherein transforming the multimedia content comprises performing a partial or whole re-encapsulation of the multimedia content from the first format to the second format, wherein re-encapsulation includes adjusting header data of the multimedia content in the first format to generate different header data for the multimedia content in the second format.

10. The method of claim 1, wherein transforming the multimedia content comprises trans-rating the multimedia content to re-encode the multimedia content in the second format such that the rate of encoding in the second format is different than the rate of encoding in the first format.

11. The method of claim 1, wherein transforming the multimedia content comprises transcoding the multimedia content to decode the multimedia content using a decoder that complies with a first coding standard and re-encode the multimedia content using an encoder that complies with a second coding standard different from the first coding standard.

12. The method of claim 1, wherein configuring the multimedia bridge comprises configuring, with a Multimedia Exchange Protocol (MEP) module of a Multimedia Management System (MMS) included within the control unit, one or more of an encoder/decoder (codec) module, a content editor module, a pre-processor module, and a post-processor module of the control unit to provide the multimedia bridge between the first format and the second format.

13. The method of claim 12, wherein the first and second formats each comprises one of a Moving Pictures Expert Group (MPEG) 4, part 14 format, a Real-time Transfer Protocol (RTP) format, a simplified version of the MPEG-4 format referred to as 3GP, an Advanced Systems Format (ASF), an Advanced Video Interleave (AVI) format, a DivX Media Format (DMF), an Enhanced Video Object (EVO) format, and a Flash video format and a Stream Control Transmission Protocol (SCTP) format.

14. An apparatus comprising:
one or more wireless modems that detect a plurality of devices, and receive multimedia content in a first format from a first application of a source device of the plurality of devices over a first wireless communication channel; and
a control unit that includes a Multimedia Management System (MMS) that receives a selection of the source device and a destination device of the plurality of devices, determines a plurality of formats supported by a second application of the destination device, determines resource data indicating a status of resources within the control unit, selects a second format from the plurality of formats based on the determined resource data, and configures the control unit to provide a multimedia bridge between the first format and a second format,
wherein the configured multimedia bridge transforms the multimedia content from the first format to the second format concurrent to the one or more wireless modems receiving a portion of the multimedia content, and
wherein the resources comprise at least one of a power resource, a memory resource, or a storage resource of the control unit; and
wherein the MMS further:
establishes, with the one or more wireless modems, a second wireless communication channel to communicate with the second application;
determines channel data, wherein the channel data defines a set of characteristics associated with one or more of the first and second wireless communication channels;
configures the one or more wireless modems based on the channel data; and
forwards, with the configured one or more wireless modems, the received multimedia content to the second application.

15. The apparatus of claim 14, wherein the configured multimedia bridge transforms the multimedia content from the first format to the second format substantially in real-time.

16. The apparatus of claim 14,
wherein the control unit includes an encoder/decoder (codec) module, a content editor module, a pre-processor module, and a post-processor module, and
wherein the MMS determines header data associated with the multimedia content that defines parameters related to the first format of the multimedia content, determines one or more bridge configuration parameters based on the header data, and interfaces with one or more of the encoder/decoder (codec) module, the content editor module, the pre-processor module, and the post-processor module of the control unit to configure the one or more of the modules to provide at least a portion of the multimedia bridge in accordance with the bridge configuration parameters.

17. The apparatus of claim 14,
wherein the control unit includes an encoder/decoder (codec) module, a content editor module, a pre-processor module, and a post-processor module, and
wherein the MMS further determines one or more bridge configuration parameters based on the resource data and interfaces with one or more of the encoder/decoder (codec) module, the content editor module, the pre-processor module, and the post-processor module of the control unit to configure the one or more of the modules to provide at least a portion of the multimedia bridge in accordance with the bridge configuration parameters.

18. The apparatus of claim 14,
wherein the control unit includes an encoder/decoder (codec) module, a content editor module, a pre-processor module, and a post-processor module, and
wherein the MMS further determines profile data associated with one or more of the first application and the second application, determines one or more bridge configuration parameters based on the profile data, and interfaces with one or more of the encoder/decoder (codec) module, the content editor module, the pre-processor module, and the post-processor module of the control unit to configure the one or more of the modules to provide at least a portion of the multimedia bridge in accordance with the bridge configuration parameters.

19. The apparatus of claim 14,
wherein the control unit includes an encoder/decoder (codec) module, a content editor module, a pre-processor module, and a post-processor module, and
wherein the MMS further determines one or more bridge configuration parameters based on the channel data, and interfaces with one or more of the encoder/decoder (codec) module, the content editor module, the pre-processor module, and the post-processor module of the control unit to configure the one or more of the modules to provide at least a portion of the multimedia bridge in accordance with the bridge configuration parameters.

20. The apparatus of claim 19,
wherein the MMS includes a Link Management Protocol (LMP) module that determines the channel data,
wherein the one or more wireless modems establishing the second wireless communication channel to communicate with the second application,
wherein the LMP module configures at least one the one or more wireless modems based on the channel data, and
wherein the configured at least one of the wireless modems forwards the received multimedia content to the second application.

21. The apparatus of claim 20, wherein the channel data comprises one or more of a Bit-Error-Ratio (BER), a Signal-to-Noise Ratio (SNR), and a Forward Error Correction (FEC) strength, and
wherein the MMS determines a level of bandwidth required over the first wireless communication channel to receive the multimedia content, determines an error rate when receiving the multimedia content over the first wireless communication channel, determines configuration parameters that provide the determined level of bandwidth with the determined error rate based on the channel data, and interfaces with the one or more wireless modems to configure at least one of the one or more wireless modems in accordance with the determined configuration parameters.

22. The apparatus of claim 14, wherein the configured multimedia bridge performs a partial or whole re-encapsulation of the multimedia content from the first format to the second format, wherein re-encapsulation includes adjusting header data of the multimedia content in the first format to generate different header data for the multimedia content in the second format.

23. The apparatus of claim 14, wherein the configured multimedia bridge trans-rates the multimedia content to re-encode the multimedia content in the second format such that the rate of encoding in the second format is different than the rate of encoding in the first format.

24. The apparatus of claim 14, wherein the configured multimedia bridge transcodes the multimedia content to decode the multimedia content using a decoder that complies with a first coding standard and re-encode the multimedia content using an encoder that complies with a second coding standard different from the first coding standard.

25. The apparatus of claim 14,
wherein the control unit includes an encoder/decoder (codec) module, a content editor module, a pre-processor module, and a post-processor module, and
wherein the MMS includes a Multimedia Exchange Protocol (MEP) module that configures one or more of the encoder/decoder (codec) module, the content editor module, the pre-processor module, and the post-processor module of the control unit to provide the multimedia bridge between the first format and a second format.

26. The apparatus of claim 25, wherein the first and second formats each comprises one of a Moving Pictures Expert Group (MPEG) 4, part 14 format, a Real-time Transfer Protocol (RTP) format, a simplified version of the MPEG-4 format referred to as 3GP, an Advanced Systems Format (ASF), an Advanced Video Interleave (AVI) format, a DivX Media Format (DMF), an Enhanced Video Object (EVO) format, and a Flash video format and a Stream Control Transmission Protocol (SCTP) format.

27. An apparatus comprising:
communication means for detecting a plurality of devices, and receiving multimedia content in a first format from a first application of a source device of the plurality of devices over a first wireless communication channel;
means for receiving a selection of the source device and a destination device of the plurality of devices;
means for determining resource data indicating a status of resources within a control unit of the apparatus, wherein the resources comprise at least one of a power resource, a memory resource, or a storage resource of the control unit;
means for determining a plurality of formats supported by a second application of the destination device, wherein the second application is different from the first application;
means for selecting a second format from the plurality of formats based on the determined resource data;
means for configuring a multimedia bridge between the first format and the second format; and
means for transforming, with the configured multimedia bridge, the multimedia content from the first format to the second format concurrent to receiving a portion of the multimedia content;
means for establishing a second wireless communication channel to communicate with the second application;
means for determining channel data, wherein the channel data defines a set of characteristics associated with one or more of the first and second wireless communication channels; and
means for configuring the communication means based on the channel data, and
wherein the configured communication means forwards the received multimedia content to the second application.

28. The apparatus of claim 27, wherein the means for transforming the multimedia content comprises means for transforming the multimedia content from the first format to the second format substantially in real-time.

29. The apparatus of claim 27, further comprising:
means for determining header data associated with the multimedia content that defines parameters related to the first format of the multimedia content; and
means determining one or more bridge configuration parameters based on the header data,
wherein the means for configuring the multimedia bridge comprises means for interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

30. The apparatus of claim 27, further comprising:
means for determining one or more bridge configuration parameters based on the resource data,
wherein the means for configuring the multimedia bridge comprises means for interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

31. The apparatus of claim 27, further comprising:
means for determining profile data associated with one or more of the first application and the second application; and
means for determining one or more bridge configuration parameters based on the profile data,
wherein the means for configuring the multimedia bridge comprises means for interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

32. The apparatus of claim 27,
wherein the apparatus further comprises:
means for determining one or more bridge configuration parameters based on the channel data,
wherein the means for configuring the multimedia bridge comprises means for interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

33. The apparatus of claim 32,
wherein the means for determining the channel data comprises a Link Management Protocol (LMP) module of a Multimedia Management System (MMS) included within the control unit,
wherein the communication means establishing the second wireless communication channel to communicate with the second application,
wherein the LMP module configures the communication means based on the channel data, and
wherein the configured communication means forwards the received multimedia content to the second application.

34. The apparatus of claim 32, wherein the channel data comprises one or more of a Bit-Error-Ratio (BER), a Signal-to-Noise Ratio (SNR), and a Forward Error Correction (FEC) strength, and
the apparatus further comprising:
means for determining a level of bandwidth required over the first wireless communication channel to receive the multimedia content;
means for determining an error rate when receiving the multimedia content over the first wireless communication channel;
means for determining configuration parameters that provide the determined level of bandwidth with the determined error rate based on the channel data; and
means interfacing with the one or more wireless modems to configure at least one of the one or more wireless modems in accordance with the determined configuration parameters.

35. The apparatus of claim 27, wherein the means for transforming the multimedia content comprises means for performing a partial or whole re-encapsulation of the multimedia content from the first format to the second format, wherein re-encapsulation includes adjusting header data of the multimedia content in the first format to generate different header data for the multimedia content in the second format.

36. The apparatus of claim 27, wherein the means for transforming the multimedia content comprises means for trans-rating the multimedia content to re-encode the multimedia content in the second format such that the rate of encoding in the second format is different than the rate of encoding in the first format.

37. The apparatus of claim 27, wherein the means for transforming the multimedia content comprises means for transcoding the multimedia content to decode the multimedia content using a decoder that complies with a first coding standard and re-encode the multimedia content using an encoder that complies with a second coding standard different from the first coding standard.

38. The apparatus of claim 27, wherein the means for configuring the multimedia bridge comprises a Multimedia Exchange Protocol (MEP) module of a Multimedia Management System (MMS) included within the control unit that configures one or more of an encoder/decoder (codec) module, a content editor module, a pre-processor module, and a post-processor module of the control unit to provide the multimedia bridge between the first format and a second format.

39. The apparatus of claim 38, wherein the first and second formats each comprises one of a Moving Pictures Expert Group (MPEG) 4, part 14 format, a Real-time Transfer Protocol (RTP) format, a simplified version of the MPEG-4 format referred to as 3GP, an Advanced Systems Format (ASF), an Advanced Video Interleave (AVI) format, a DivX Media Format (DMF), an Enhanced Video Object (EVO) format, and a Flash video format and a Stream Control Transmission Protocol (SCTP) format.

40. A non-transitory computer-readable storage medium comprising instructions that cause a processor to:
detect a plurality of devices;
receive a selection of a source device from the plurality of detected devices;
receive a selection of a destination device from the plurality of detected devices;
receive multimedia content in a first format from a first application of the source device over a first wireless communication channel via one or more wireless modems;
determine a plurality of formats supported by a second application of the destination device, wherein the second application of the destination device is different from the first application;
determine resource data indicating a status of resources within a control unit, wherein the control unit is part of a device that is a different device than the source device or the destination device, and wherein the resources comprise at least one of a power resource, a memory resource, or a storage resource of the control unit;
select a second format from the plurality of formats based on the determined resource data;
configure a multimedia bridge between the first format and the second format; and
transform, with the configured multimedia bridge, the multimedia content from the first format to the second format concurrent to receiving a portion of the multimedia content;
establish, with the one or more wireless modems, a second wireless communication channel to communicate with the second application;
determine channel data, wherein the channel data defines a set of characteristics associated with one or more of the first and second wireless communication channels;
configure the one or more wireless modems based on the channel data; and
forward, with the configured one or more wireless modems, the received multimedia content to the second application.

41. The computer-readable storage medium of claim 40, wherein the instructions further cause the processor to transform the multimedia content from the first format to the second format substantially in real-time.

42. The computer-readable storage medium of claim 40, wherein the instructions further cause the processor to:
  determine header data associated with the multimedia content that defines parameters related to the first format of the multimedia content;
  determine one or more bridge configuration parameters based on the header data; and
  interface with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

43. The computer-readable storage medium of claim 40, wherein the instructions further cause the processor to:
  determine one or more bridge configuration parameters based on the resource data; and
  interface with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

44. The computer-readable storage medium of claim 40, wherein the instructions further cause the processor to:
  determine profile data associated with one or more of the first application and the second application;
  determine one or more bridge configuration parameters based on the profile data; and
  interfacing with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

45. The computer-readable storage medium of claim 40, wherein the instructions further cause the processor to:
determine one or more bridge configuration parameters based on the channel data; and
interface with one or more of an encoder/decoder (codec) module, a content editor module, a pre-processor module, and a post-processor module of the control unit to configure the one or more of the modules to provide at least a portion of the multimedia bridge in accordance with the bridge configuration parameters.

46. The computer-readable storage medium of claim 45, wherein the channel data comprises one or more of a Bit-Error-Ratio (BER), a Signal-to-Noise Ratio (SNR), and a Forward Error Correction (FEC) strength, and
wherein the instructions further cause the processor to:
determine a level of bandwidth required over the first wireless communication channel to receive the multimedia content; and
determine an error rate when receiving the multimedia content over the first wireless communication channel;
determine configuration parameters that provide the determined level of bandwidth with the determined error rate based on the channel data; and
interface with the one or more wireless modems to configure at least one of the one or more wireless modems in accordance with the determined configuration parameters.

* * * * *